(12) United States Patent
Sato et al.

(10) Patent No.: US 11,333,933 B2
(45) Date of Patent: May 17, 2022

(54) METHOD OF MANUFACTURING OPTICAL ELEMENT AND OPTICAL ELEMENT

(71) Applicant: FUJIFILM Corporation, Tokyo (JP)

(72) Inventors: Hiroshi Sato, Minami-ashigara (JP); Yukito Saitoh, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 17/158,741

(22) Filed: Jan. 26, 2021

(65) Prior Publication Data

US 2021/0149256 A1 May 20, 2021

Related U.S. Application Data

(63) Continuation of application No. PCT/JP2019/029516, filed on Jul. 26, 2019.

(30) Foreign Application Priority Data

Jul. 27, 2018 (JP) .............................. JP2018-141337

(51) Int. Cl.
*G02F 1/1337* (2006.01)
*G02F 1/1335* (2006.01)

(52) U.S. Cl.
CPC .. *G02F 1/133788* (2013.01); *G02F 1/133504* (2013.01); *G02F 1/133512* (2013.01)

(58) Field of Classification Search
None
See application file for complete search history.

(56) References Cited

U.S. PATENT DOCUMENTS 7,196,758 B2 3/2007 Crawford et al.
2002/0158947 A1* 10/2002 Kanno ................. B41J 2/161
347/70

(Continued)

FOREIGN PATENT DOCUMENTS

JP 2005292241 A * 10/2005
JP 2008-532085 A 8/2008

(Continued)

OTHER PUBLICATIONS

English translation of JP-2005292241-A, Title: Optical Anisotropic Substance and its Manufacturing Method, Author: Takada Hirokazu; Ono Yoshiyuki; Kawamura Joji; Date of publication: Oct. 20, 2005 (Year: 2005).*

(Continued)

*Primary Examiner* — Shan Liu
(74) *Attorney, Agent, or Firm* — Birch, Stewart, Kolasch & Birch, LLP

(57) ABSTRACT

Provided are a method of manufacturing an optical element in which an optically-anisotropic layer having a small amount of in-plane unevenness can be prepared, and an optical element. The method of manufacturing an optical element is a method of manufacturing an optical element, the optical element including an optically-anisotropic layer that is formed using a liquid crystal composition including a liquid crystal compound, an alignment film that aligns the liquid crystal compound, and a support, the method including: an alignment film forming step of forming the alignment film on one surface of the support; and an optically-anisotropic layer forming step of forming the optically-anisotropic layer on the alignment film, in which the alignment film includes a photo-alignable material, the alignment film forming step includes an exposure step of exposing different in-plane positions of the alignment film to light components having different polarization directions, (Continued)

and the support has a light absorption band that overlaps a light absorption band where a photochemical reaction occurs in the alignment film by irradiating the alignment film with the polarized light in the exposure step.

20 Claims, 8 Drawing Sheets

(56) References Cited

U.S. PATENT DOCUMENTS

| | | | | |
|---|---|---|---|---|
| 2008/0278675 | A1* | 11/2008 | Escuti | G02B 27/283 |
| | | | | 349/201 |
| 2010/0225876 | A1 | 9/2010 | Escuti et al. | |
| 2010/0231847 | A1* | 9/2010 | Escuti | G02F 1/1337 |
| | | | | 349/201 |
| 2011/0027494 | A1* | 2/2011 | Tan | B29D 11/0074 |
| | | | | 427/508 |
| 2015/0331167 | A1* | 11/2015 | Escuti | G02B 5/32 |
| | | | | 359/3 |
| 2016/0195660 | A1 | 7/2016 | Nakao | |

FOREIGN PATENT DOCUMENTS

| | | |
|---|---|---|
| JP | 2010-525394 A | 7/2010 |
| JP | 2010-525395 A | 7/2010 |
| JP | 2011-39510 A | 2/2011 |
| JP | 2013-142727 A | 7/2013 |
| JP | 2015-532468 A | 11/2015 |
| WO | WO 2015/005122 A1 | 1/2015 |

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/2019/029516, dated Feb. 11, 2021.
International Search Report (Form PCT/ISA/210)for International Application No. PCT/JP2019/029516, dated Oct. 21, 2019, with English translation.
Japanese Office Action for corresponding Japanese Application No. 2020-532515, dated Jan. 4, 2022, with English translation.

* cited by examiner

METHOD OF MANUFACTURING OPTICAL ELEMENT AND OPTICAL ELEMENT

CROSS-REFERENCE TO RELATED APPLICATIONS

This application is a Continuation of PCT International Application No. PCT/JP2019/029516 filed on Jul. 26, 2019, which claims priority under 35 U.S.C. § 119(a) to Japanese Patent Application No. 2018-141337 filed on Jul. 27, 2018. The above application is hereby expressly incorporated by reference, in its entirety, into the present application.

BACKGROUND OF THE INVENTION

1. Field of the Invention

The present invention relates to a method of manufacturing an optical element in which light is refracted, and an optical element.

2. Description of the Related Art

In many optical devices or systems, diffraction of light is used, and a diffraction element formed of a liquid crystal is known. Liquid crystal molecules having anisotropy are regularly arranged such that anisotropy of optical properties is exhibited. In a liquid crystal layer (optically-anisotropic layer) in which the liquid crystal molecules are arranged as described above, a liquid crystal arrangement pattern can be used as a diffraction element by being adjusted.

For example, JP2010-525394A discloses a polarization diffraction grating including a substrate and a first polarization diffraction grating layer on the substrate. The first polarization diffraction grating layer includes a molecular structure that is twisted according to a first twist sense over a first thickness defined between opposing faces of the first polarization diffraction grating layer.

In addition, as a method of forming the polarization diffraction grating layer, JP2010-525394A discloses that an alignment layer for aligning liquid crystal molecules is exposed or patterned using coherent light from a laser with orthogonal circular polarizations to form a polarization interference pattern such that a liquid crystal composition applied to the liquid crystal composition is arranged in the pattern formed on the alignment layer.

In addition, as a method of preparing a diffraction element formed of a liquid crystal, U.S. Pat. No. 7,196,758B discloses a method including: a step of exposing an alignment material to an interference pattern to cause a chemical reaction in the alignment material; and exposing the alignment material to a liquid crystal such that the liquid crystal aligns relative to the alignment material based on the interference pattern.

SUMMARY OF THE INVENTION

According to an investigation by the present inventors, it was found that, in a case where an alignment film is irradiated with coherent light to form an alignment pattern on the alignment film and a liquid crystal layer is formed on the alignment film, there is a problem in that unevenness occurs in a plane of the liquid crystal layer.

As the reason for this, the present inventors presumed to be as follows. In a case where the alignment film is irradiated with coherent light, the coherent light is reflected again from a surface of a support opposite to the surface where the alignment film is formed, and the alignment film is irradiated with the reflected light. Therefore, unevenness occurs in a pattern formed on the alignment film, and unevenness also occurs in the liquid crystal layer formed on the alignment film.

An object of the present invention is to solve the above-described problem of the related art and to provide a method of manufacturing an optical element in which an optically-anisotropic layer having a small amount of in-plane unevenness can be prepared, and an optical element.

In order to achieve the object, an optical element according to an aspect of the present invention has the following configurations.

[1] A method of manufacturing an optical element, the optical element including an optically-anisotropic layer that is formed using a liquid crystal composition including a liquid crystal compound, an alignment film that aligns the liquid crystal compound, and a support, the method comprising:

an alignment film forming step of forming the alignment film on one surface of the support; and an optically-anisotropic layer forming step of forming the optically-anisotropic layer on the alignment film, in which the alignment film includes a photo-alignable material, the alignment film forming step includes an exposure step of exposing different in-plane positions of the alignment film to light components having different polarization directions, and the support has a light absorption band that overlaps a light absorption band where a photochemical reaction occurs in the alignment film by irradiating the alignment film with the polarized light in the exposure step.

[2] The method of manufacturing an optical element according to [1], in which in the exposure step, the alignment film is exposed to two or more polarized beams that are caused to interfere with each other.

[3] The method of manufacturing an optical element according to [1], in which in the exposure step, light is caused to be incident into a polarization diffractive optical element such that the light is converted into polarized light, and the alignment film is exposed to the polarized light.

[4] The method of manufacturing an optical element according to [1], in which in the exposure step, the different in-plane positions of the alignment film are exposed by freely changing a polarization direction of a focused polarized beam.

[5] The method of manufacturing an optical element according to any one of [1] to [4], in which the light to which the alignment film is exposed is laser light.

[6] The method of manufacturing an optical element according to [2], in which the two or more polarized beams are laser light.

[7] The method of manufacturing an optical element according to [2] or [6], in which at least two beams among the two or more polarized beams have the same wavelength.

[8] The method of manufacturing an optical element according to any one of [2], [6], and [7], in which at least two beams among the two or more polarized beams have the same light intensity.

[9] The method of manufacturing an optical element according to any one of [2] and [6] to [8], in which at least two beams among the two or more polarized beams are different polarized light components.

[10] The method of manufacturing an optical element according to any one of [2] and [6] to [9], in which the two or more polarized beams include polarized light components perpendicular to each other.

[11] The method of manufacturing an optical element according to any one of [2] and [6] to [10], in which the two or more polarized beams include left circularly polarized light and right circularly polarized light.

[12] The method of manufacturing an optical element according to any one of [2] and [6] to [11], in which in the exposure step, a polarization state of coherent light obtained by causing the two or more polarized beams to interfere with each other has a period pattern.

[13] The method of manufacturing an optical element according to [12], in which the alignment film exhibits anisotropy through a photochemical reaction based on the period pattern of the polarization state of the coherent light obtained by causing the two or more polarized beams to interfere with each other.

[14] The method of manufacturing an optical element according to [13], in which the optically-anisotropic layer has a liquid crystal alignment pattern based on the anisotropic period pattern of the alignment film.

[15] The method of manufacturing an optical element according to [3], in which the polarization diffractive optical element has a phase difference of λe/2 with respect to a wavelength λe of the light to which the polarization diffractive optical element exposes the alignment film.

[16] The method of manufacturing an optical element according to [3] or [15], in which the light incident into the polarization diffractive optical element is linearly polarized light.

[17] The method of manufacturing an optical element according to [4], in which the focused polarized beam is linearly polarized light. [18] The method of manufacturing an optical element according to any one of [1] to [17], in which the alignment film exposed in the exposure step aligns the liquid crystal compound such that the liquid crystal compound has an alignment pattern in which a direction of an optical axis derived from the liquid crystal compound corresponds to a polarization direction of the light to which the alignment film is exposed.

[19] The method of manufacturing an optical element according to any one of [1] to [18], in which the alignment film exposed in the exposure step aligns the liquid crystal compound such that the liquid crystal compound has an alignment pattern in which a direction of an optical axis derived from the liquid crystal compound continuously changes while rotating in at least one in-plane direction.

[20] The method of manufacturing an optical element according to any one of [1] to [19], in which a wavelength of at least a part of a light absorption band of the alignment film is 200 nm to 500 nm.

[21] The method of manufacturing an optical element according to any one of [1] to [20], comprising:

a peeling step of peeling the support after the optically-anisotropic layer forming step.

[22] The method of manufacturing an optical element according to any one of [1] to [21], in which the support includes a light absorbing layer that absorbs light in a light absorption band overlapping a light absorption band where a photochemical reaction of the alignment film occurs, and the method comprises a peeling step of peeling the support and the light absorbing layer together after the optically-anisotropic layer forming step.

[23] An optical element that is prepared using the method of manufacturing an optical element according to any one of [1] to [22], the optical element comprising an optically-anisotropic layer that is formed using a composition including a liquid crystal compound, an alignment layer, and a support in this order, in which the optically-anisotropic layer has a liquid crystal alignment pattern in which a direction of an optical axis derived from the liquid crystal compound changes while continuously rotating in at least one in-plane direction, the alignment layer includes a photo-alignable material, and the support has a light absorption band that overlaps a light absorption band where a photochemical reaction of the alignment film occurs.

[24] The optical element according to [23], in which the optically-anisotropic layer has a function of diffracting incident light and allowing transmission of the diffracted light.

[25] The optical element according to [23] or [24], in which the optically-anisotropic layer has a region where alignment of the liquid crystal compound has twisting properties in a thickness direction.

[26] The optical element according to [23], in which the optically-anisotropic layer has cholesteric alignment.

[27] The optical element according to [26], in which the optically-anisotropic layer has a function of diffracting incident light and reflecting the diffracted light.

With the method of manufacturing an optical element and the optical element according to aspects of the present invention, an optically-anisotropic layer having a small amount of in-plane unevenness can be prepared.

DESCRIPTION OF THE PREFERRED EMBODIMENTS

Figure 1:
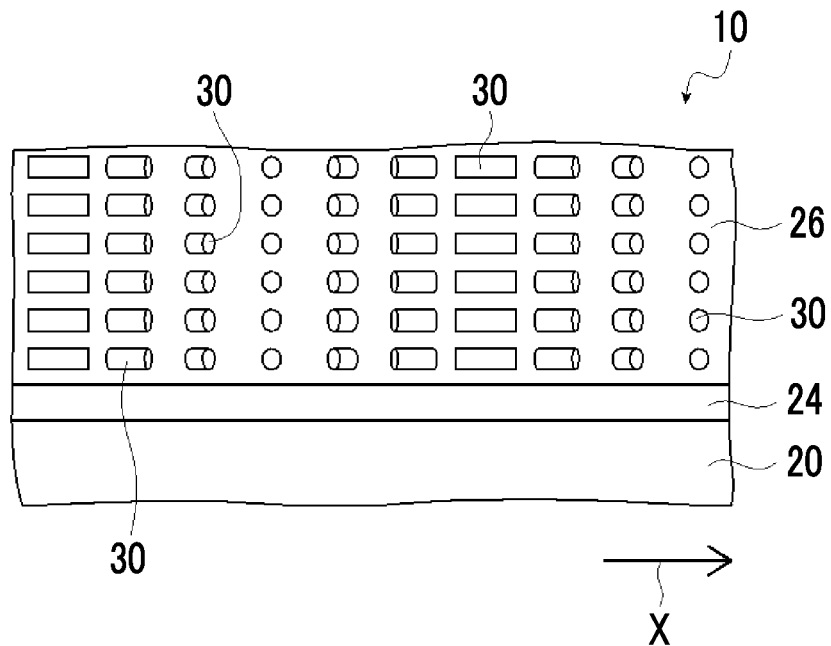
FIG. 1 is a diagram conceptually showing an example of an optical element according to the present invention prepared in a manufacturing method according to the present invention.

Hereinafter, a method of manufacturing an optical element and an optical element according to an embodiment of the present invention will be described in detail based on a preferable example shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In the present specification, Re($\lambda$) represents an in-plane retardation at a wavelength $\lambda$. Unless specified otherwise, the wavelength $\lambda$ refers to 550 nm.

In the present specification, Re($\lambda$) is a value measured at the wavelength $\lambda$ using AxoScan (manufactured by Axometrics, Inc.). By inputting an average refractive index ((nx+ny+nz)/3) and a thickness (d (μm)) to AxoScan, the following expressions can be calculated.

Slow Axis Direction (°)

$Re(\lambda)=R0(\lambda)$

R0($\lambda$) is expressed as a numerical value calculated by AxoScan and represents Re($\lambda$).

[Method of Manufacturing Optical Element]

The method of manufacturing an optical element according to the embodiment of the present invention (hereinafter, also referred to as "the manufacturing method according to the embodiment of the present invention") is a method of manufacturing an optical element, the optical element including an optically-anisotropic layer that is formed using a liquid crystal composition including a liquid crystal compound, an alignment film that aligns the liquid crystal compound, and a support, the method comprising:

an alignment film forming step of forming the alignment film on one surface of the support; and an optically-anisotropic layer forming step of forming the optically-anisotropic layer on the alignment film, in which the alignment film includes a photo-alignable material, the alignment film forming step includes an exposure step of exposing the alignment film to two or more polarized beams that are caused to interfere with each other, and the support has a light absorption band that overlaps a light absorption band where a photochemical reaction of the alignment film occurs in the exposure step.

In addition, an optical element prepared using the manufacturing method according to the embodiment of the present invention comprises:

an optically-anisotropic layer that is formed using a composition including a liquid crystal compound, an alignment layer, and a support in this order, in which the optically-anisotropic layer has a liquid crystal alignment pattern in which a direction of an optical axis derived from the liquid crystal compound changes while continuously rotating in at least one in-plane direction, the alignment layer includes a photo-alignable material, and the support has a light absorption band that overlaps a light absorption band where a photochemical reaction of the alignment film occurs.

First, the method of manufacturing an optical element according to the embodiment of the present invention will be described using an example.

One example of the method of manufacturing an optical element includes:

a step of preparing a support having a light absorption band that overlaps a light absorption band where a photochemical reaction of an alignment film occurs;

an alignment film forming step including an application step and an alignment film forming step, the application step of applying an alignment film including a photo-alignable material to one surface of the prepared support, and the exposure step of exposing the formed coating film to two or more polarized beams that are caused to interfere with each other; and an optically-anisotropic layer forming step of forming the optically-anisotropic layer on the alignment film.

Figure 2:
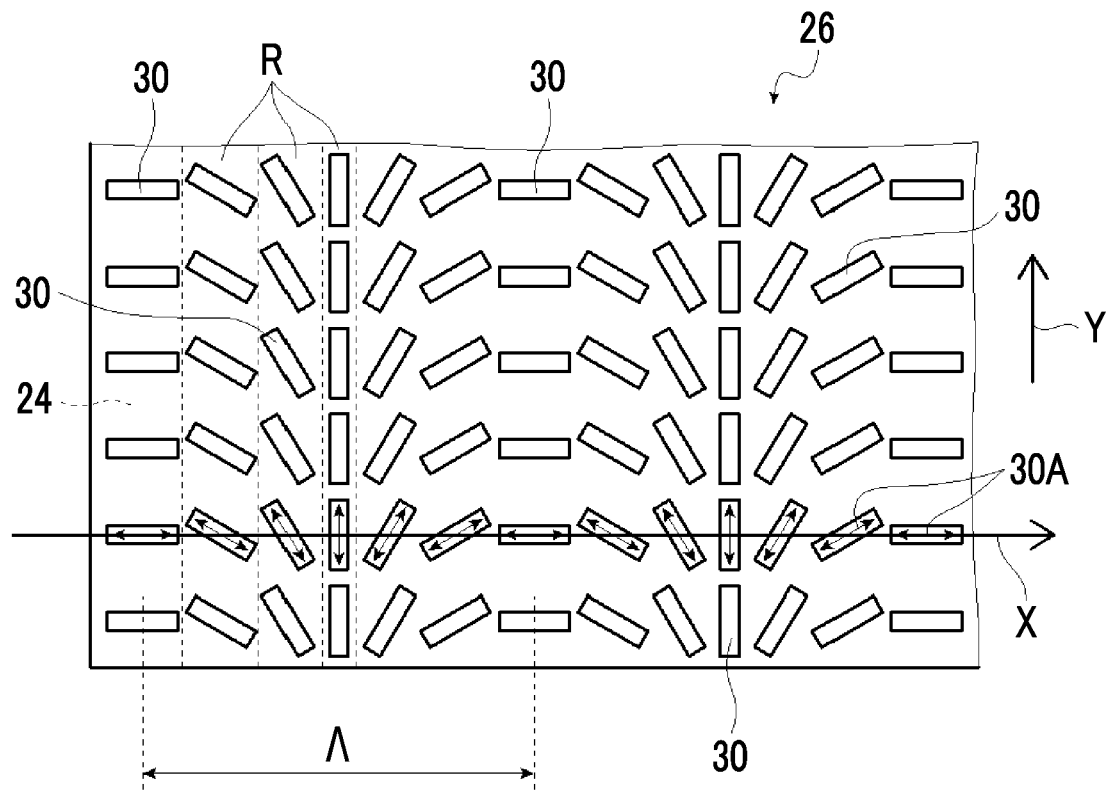
FIG. 2 is a plan view showing an optically-anisotropic layer of the optical element shown in FIG. 1.

In the manufacturing method according to the embodiment of the present invention, an optical element 10 shown in FIGS. 1 and 2 is prepared. The optical element 10 shown in FIGS. 1 and 2 includes a support 20, an alignment film 24, and an optically-anisotropic layer 26 in this order. The optically-anisotropic layer 26 has a liquid crystal alignment pattern in which a direction of an optical axis derived from the liquid crystal compound changes while continuously rotating in at least one in-plane direction.

The optical element 10 will be described below in detail.

<<Support>>

The support 20 used in the manufacturing method according to the embodiment of the present invention is a film-like material (sheet-shaped material or plate-shaped material) that supports the alignment film 24 and the optically-anisotropic layer 26.

Here, in the present invention, the support 20 has a light absorption band that overlaps a light absorption band where a photochemical reaction of an alignment film described below occurs. That is, the support 20 has a function of absorbing light in a wavelength range that overlaps the light absorption band where the photochemical reaction of the alignment film occurs.

As a material of the support 20, various resins used as a material of a support in an optical element can be used. Here, in order for the support 20 to absorb light in a predetermined wavelength range, a resin for forming the support may include a light absorbing material. Alternatively, a resin material that absorbs light in a predetermined wavelength range may be used as a material of the support. Alternatively, as in an example shown in Example 3, the support 20 may include a main support 36 and a light absorbing layer 38 that absorbs light in a predetermined wavelength range.

As the material of the support 20, a support having high transparency is preferable, and examples thereof include a polyacrylic resin such as polymethyl methacrylate, a cellulose resin such as cellulose triacetate, a cycloolefin polymer resin, polyethylene terephthalate (PET), polycarbonate, and polyvinyl chloride. The material of the support 20 is not limited to a resin, and glass may be used.

The light absorbing material is not particularly limited, and a well-known light absorbing material can be used depending on a wavelength range to be absorbed. For example, in a case where light to be absorbed is ultraviolet light, a well-known ultraviolet absorber such as a benzotriazole or a benzophenone can be used. In addition, in a case where light to be absorbed is in a wavelength range of 300 nm to 400 nm, a well-known light absorber such as a compound described in JP2006-184874A or a compound described in JP1994-148430A (JP-S6-148430A) can be used.

The kind and concentration of the light absorbing material may be appropriately selected depending on dispersibility in the resin to be dispersed, solubility, an absorption wavelength, an absorption coefficient, the thickness of the support, and the like.

In a case where the support 20 includes the main support 36 and the light absorbing layer 38, as a material of the main support 36, the same material as that of the support 20 can be used.

In addition, the light absorbing layer 38 may be a layer formed of the above-described resin material that absorbs the predetermined light or may be a resin layer including the above-described light absorbing material.

The thickness of the support 20 is not particularly limited and may be appropriately set depending on the use of the optical element 10, a material for forming the support 20, and the like in a range where the alignment film and the optically-anisotropic layer can be supported.

The thickness of the support 20 is preferably 1 to 1000 μm, more preferably 3 to 250 μm, and still more preferably 5 to 150 μm.

In the optical element 10 according to the embodiment of the present invention, a configuration in which the optically-anisotropic layer is transferred to another substrate after peeling off the support 20 is also preferably used. For example, the optically-anisotropic layer can be transferred to a substrate having a curved shape after peeling off the support 20. It is preferable that the optically-anisotropic layer as a thin layer is used by peeling off the support 20 from the viewpoint that the application range can be widened, for example, this configuration can be applied to optical elements having various shapes and applications.

<<Alignment Film Forming Step>>

The alignment film forming step includes: an application step of applying a composition for forming the alignment film 24 to the support 20; and an exposure step of exposing the alignment film (coating film) formed on the support to two or more polarized beams that are caused to interfere with each other.

The alignment film 24 is a layer for aligning a liquid crystal compound 30 to a predetermined liquid crystal alignment pattern during the formation of the optically-anisotropic layer 26.

Although described below, in the optical element 10 according to the embodiment of the present invention, the optically-anisotropic layer 26 has a liquid crystal alignment pattern in which a direction of an optical axis 30A (refer to FIG. 2) derived from the liquid crystal compound 30 changes while continuously rotating in one in-plane direction (arrow X direction described below). Accordingly, the alignment film of each of the optically-anisotropic members is formed such that the optically-anisotropic layer can form the liquid crystal alignment pattern.

In the following description, "the direction of the optical axis 30A rotates" will also be simply referred to as "the optical axis 30A rotates".

In the optical element 10 according to the embodiment of the present invention, for example, the alignment film is a so-called photo-alignment film obtained by irradiating a photo-alignable material with polarized light or non-polarized light. That is, in the optical element 10 according to the embodiment of the present invention, a photo-alignment film that is formed by applying a photo-alignable material to the support 20 is used as the alignment film.

The photo-alignment film is irradiated with polarized light from a vertical direction or an oblique direction.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking ester described in JP2003-520878A, JP2004-529220A, and JP4162850B; and a photodimerizable compound, in particular, a cinnamate (cinnamic acid) compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking ester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2

(Application Step)

A method of applying a composition for forming the alignment film is not particularly limited, and various well-known methods used for applying liquid, for example, bar coating, gravure coating, or spray coating can be used. In addition, the coating thickness of the composition (the thickness of the coating film) that is required to obtain an alignment film having a desired thickness may be appropriately set depending on the composition and the like.

(Exposure Step)

In the exposure step, the coating film for forming the alignment film is exposed to two or more polarized beams that are caused to interfere with each other after the application step. As a result, a predetermined alignment pattern is formed on the alignment film such that the optically-anisotropic layer formed on the alignment film can form a predetermined liquid crystal alignment pattern. Specifically, in the optically-anisotropic layer formed on the alignment film, an alignment pattern is formed on the alignment film, the alignment pattern being a pattern in which a direction of an optical axis derived from the liquid crystal compound changes while continuously rotating in at least one in-plane direction.

Figure 4:
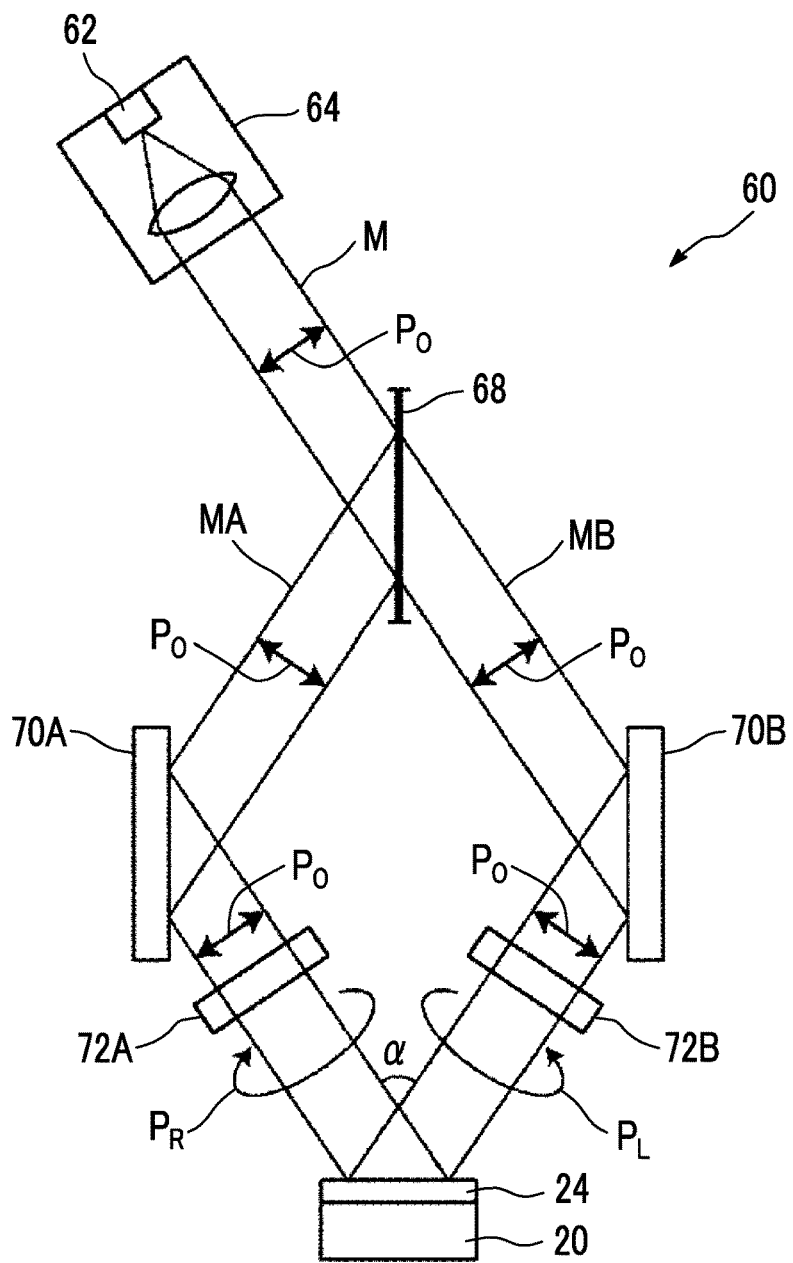
FIG. 4 is a diagram conceptually showing an example of an exposure device that exposes an alignment film in the manufacturing method according to the present invention.

FIG. 4 conceptually shows an example of an exposure device that exposes the alignment film to form an alignment pattern.

An exposure device 60 shown in FIG. 4 includes: a light source 64 that includes a laser 62; a beam splitter 68 that splits laser light M emitted from the laser 62 into two beams MA and MB; mirrors 70A and 70B that are disposed on optical paths of the splitted two beams MA and MB; and μ/4 plates 72A and 72B.

Although not shown in the drawing, the light source 64 emits linearly polarized light $P_0$. The λ/4 plate 72A converts the linearly polarized light $P_0$ (beam MA) into right circularly polarized light $P_R$, and the μ/4 plate 72B converts the linearly polarized light $P_0$ (beam MB) into left circularly polarized light $P_L$.

The support 20 including the alignment film 24 (coating film) on which the alignment pattern is not yet formed is disposed at an exposed portion, the two beams MA and MB intersect and interfere each other on the alignment film 24, and the alignment film 24 is irradiated with and exposed to the coherent light.

Due to the interference at this time, the polarization state of light with which the alignment film 24 is irradiated periodically changes according to interference fringes. As a result, in the alignment film 24, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 30A derived from the liquid crystal compound 30 continuously rotates in the in-plane direction, the length (single period Λ) of the single period over which the optical axis 30A rotates by 180° in the in-plane direction in which the optical axis 30A rotates can be adjusted.

By forming the optically-anisotropic layer on the alignment film having the alignment pattern in which the alignment state periodically changes, as described below, the optically-anisotropic layer 26 having the liquid crystal alignment pattern in which the optical axis 30A derived from the liquid crystal compound 30 continuously rotates in the in-plane direction can be formed.

In addition, by rotating the optical axes of the λ/4 plates 72A and 72B by 90°, respectively, the rotation direction of the optical axis 30A can be reversed.

Here, as described above, according to an investigation by the present inventors, it was found that, in a case where the alignment film is irradiated with the coherent light to form the alignment pattern on the alignment film and the liquid crystal layer is formed on the alignment film, there is a problem in that unevenness occurs in a plane of the liquid crystal layer. It is presumed that, due to this reason, a part of the irradiated light is reflected from an interface of the support 20 and irradiated to the alignment film again.

Figure 5:
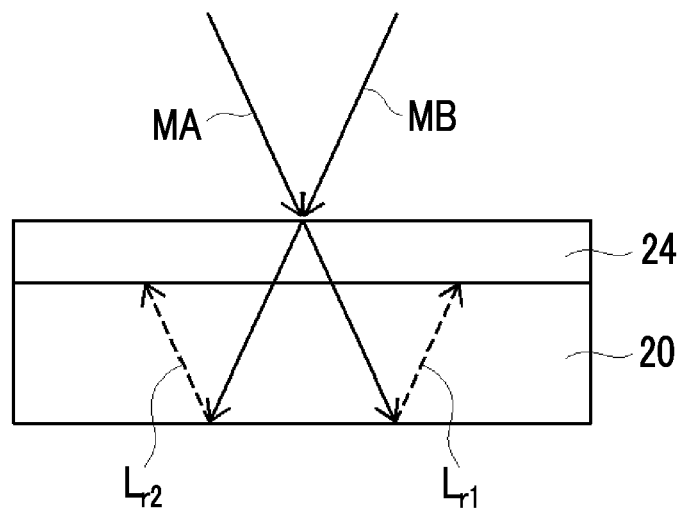
FIG. 5 is a conceptual diagram showing a problem of a manufacturing method in the related art.

Specifically, as shown in FIG. 5, a part of the beams (MA, MB) irradiated from the alignment film 24 side transmits through the alignment film 24 and is incident into the support 20 such that a part of the light incident into the support 20 is reflected from a surface (hereinafter, referred to as "rear surface") of the support 20 opposite to the surface where the alignment film 24 is formed. The light ($L_{r1}$, $L_{r2}$) reflected from the rear surface of the support 20 is irradiated again to the alignment film 24. At this time, the beams (MA, MB) with which the alignment film 24 is irradiated is irradiated to a main surface of the alignment film 24 from an oblique direction. Therefore, the light ($L_{r1}$, $L_{r2}$) reflected from the rear surface of the support 20 is irradiated to a region of the alignment film 24 different from the region irradiated with the beam (MA, MB). The alignment film 24 is also exposed to the reflected light ($L_{r1}$, $L_{r2}$). Therefore, the region different from the region irradiated with the beams (MA, MB) is also exposed. Thus, the alignment pattern formed by the beams (MA, MB) overlaps the exposure pattern formed by the reflected light ($L_{r1}$, $L_{r2}$) such that unevenness occurs. As a result, in the optically-anisotropic layer 26 formed on the alignment film 24 where unevenness occurs, unevenness also occurs in the alignment pattern of the liquid crystal compound. In a case where unevenness occurs in the optically-anisotropic layer 26, desired optical properties cannot be obtained.

On the other hand, in the manufacturing method according to the embodiment of the present invention, the support 20 has the light absorption band that overlaps the light absorption band where the photochemical reaction of the alignment film 24 occurs. That is, the support 20 has a function of absorbing at least a part of the light (beams MA, MB) irradiated to the alignment film 24 in the exposure step.

Since the support 20 has the function of absorbing at least a part of the beams (MA, MB), the beams (MA, MB) that transmit through the alignment film 24 and are incident into the support 20 are absorbed by the support 20, and the amount of the light ($L_{r1}$, $L_{r2}$) reflected from the rear surface of the support 20 is reduced. Accordingly, the exposure of the alignment film 24 to the reflected light ($L_{r1}$, $L_{r2}$) can be suppressed, and the occurrence of unevenness in the alignment pattern formed on the alignment film 24 can be suppressed. As a result, the occurrence of unevenness in the alignment pattern of the optically-anisotropic layer 26 formed on the alignment film 24 can be suppressed, and desired optical properties can be obtained.

A wavelength of at least a part of the light absorption band of the alignment film 24, that is, a wavelength of the light that is irradiated in the exposure step is preferably 200 nm to 500 nm, more preferably 250 nm to 450 nm, and still more preferably 300 nm to 400 nm.

From the viewpoint of suppressing the occurrence of unevenness in the alignment pattern of the optically-anisotropic layer 26, it is preferable that the support 20 can absorb 50% or higher of the light irradiated to the alignment film 24 in the exposure step, it is more preferable that the support 20 can absorb 75% or higher of the light irradiated to the alignment film 24 in the exposure step, and it is still more preferable that the support 20 can absorb 90% or higher of the light irradiated to the alignment film 24 in the exposure step.

The absorbance of the light can be measured using a spectrophotometer or the like.

On the other hand, the optical element 10 allows transmission of incidence light and diffracts the incidence light. Therefore, it is preferable that the support 20 has high transmittance with respect to a wavelength range of the light that is transmitted and diffracted. Specifically, the transmittance with respect to the wavelength range of the light that is transmitted and diffracted is preferably 50% or higher, more preferably 70% or higher, and still more preferably 85% or higher.

For example, in a case where the light that is irradiated to the alignment film 24 in the exposure step is ultraviolet light and the light that is transmitted through and diffracted by the optical element 10 is visible light, as the support 20, a support that has high absorbance with respect to ultraviolet light and has high transmittance with respect to visible light may be used.

It is not preferable that the absorbance of the support 20 with respect to the wavelength range of the light that is diffracted is high from the viewpoint of reducing the use efficiency of the light that is transmitted and diffracted. In addition, in a case where the reflectivity of the support 20 with respect to the wavelength range of the light that is diffracted is high, the use efficiency of the light that is transmitted and diffracted decreases, and unnecessary reflected light may be generated.

In the example shown in FIG. 4, the light (beam) that is irradiated in the exposure step is laser light, but the embodiment is not limited thereto. The laser light has a narrow wavelength range and has high directivity. Therefore, laser light is preferable from the viewpoint that the alignment pattern can be formed with high accuracy.

In addition, it is preferable that two or more polarized beams with which the alignment film is irradiated have the same wavelength. By using the beams having the same wavelength, a period pattern depending on the polarization state of coherent light can be formed and controlled.

In addition, it is preferable that two or more polarized beams with which the alignment film is irradiated have the same light intensity. By using the beams having the same intensity, a period pattern depending on the polarization state of coherent light can be formed and controlled.

In addition, it is preferable that the two or more polarized beams with which the alignment film is irradiated include different polarized light components, it is more preferable that the two or more polarized beams include polarized light components perpendicular to each other, and it is more preferable that the two or more polarized beams include left circularly polarized light and right circularly polarized light. As a result, a period pattern depending the polarization state can be imparted to coherent light, and the alignment film can exhibit anisotropy corresponding to the period pattern depending on the polarization state of the coherent light, the anisotropy varies depending on the polarization state of the coherent light.

<<Optically-Anisotropic Layer Forming Step>>

The optically-anisotropic layer forming step is a step of forming the optically-anisotropic layer on the alignment film on which the alignment pattern is formed.

Specifically, for example, the optically-anisotropic layer forming step includes: a step of applying a liquid crystal composition including the prepared liquid crystal compound to the alignment film 24; and a step of curing the applied liquid crystal composition.

The liquid crystal composition may be prepared using a well-known method in the related art. In addition, for the application of the liquid crystal composition, various well-known methods used for applying liquid, for example, bar coating, gravure coating, or spray coating can be used. In addition, the coating thickness of the liquid crystal composition (the thickness of the coating film) that is required to obtain an optically-anisotropic layer having a desired thickness may be appropriately set depending on the liquid crystal composition and the like.

Here, the alignment pattern is formed on the alignment film. Therefore, the liquid crystal compound of the liquid crystal composition applied to the alignment film is aligned along the alignment pattern (anisotropic period pattern) of the alignment film.

The liquid crystal composition is optionally dried and/or heated and then cured. The liquid crystal composition may be cured using a well-known method such as photopolymerization or thermal polymerization. For the polymerization, photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

By curing the liquid crystal composition, the liquid crystal compound in the liquid crystal composition is immobilized in a state (liquid crystal alignment pattern) where the liquid crystal compound is aligned along the alignment pattern of the alignment film. As a result, an optically-anisotropic layer having a liquid crystal alignment pattern in which a direction of an optical axis derived from the liquid crystal compound changes while continuously rotating in at least one in-plane direction is formed. The liquid crystal alignment pattern of the optically-anisotropic layer will be described below in detail.

When the optically-anisotropic layer is completed, the liquid crystal compound does not have to exhibit liquid crystal properties. For example, the molecular weight of the polymerizable liquid crystal compound may be increased by a curing reaction such that the liquid crystallinity thereof is lost.

Figure 3:
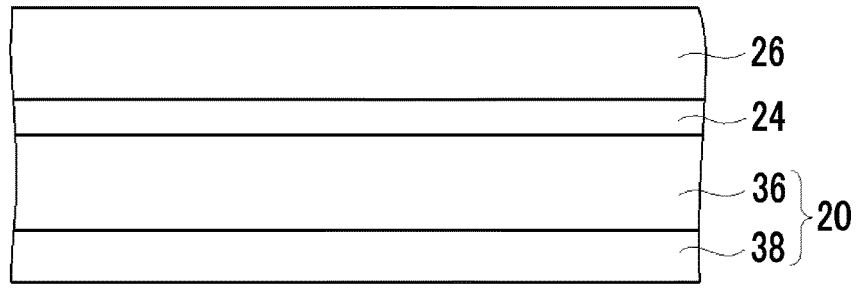
FIG. 3 is a diagram conceptually showing another example of the optical element according to the present invention prepared in the manufacturing method according to the present invention.

In a case where the support 20 is configured to include the main support 36 and the light absorbing layer 38 as shown in FIG. 3, the manufacturing method may include a peeling step of peeling the light absorbing layer 38 after the exposure step and before or after the optically-anisotropic layer forming step.

By configuring the light absorbing layer 38 to be peeled off, even in a case where the wavelength range of the light with which the alignment film is irradiated in the exposure step and the wavelength range of the light that is transmitted through and diffracted by the optical element overlap each other or are close to each other, unevenness can be suppressed by increasing the absorbance of light to suppress reflection in the exposure step, and the transmittance of light in the wavelength range that is transmitted through and diffracted by the optical element can be increased.

The same can be applied even in a case where the support 20 is configured to absorb light in a predetermined wavelength range as shown in FIG. 1 and in a case where the manufacturing method includes a peeling step of peeling off the support 20 before or after the optically-anisotropic layer forming step. In a case where the support 20 is peeled off, the optically-anisotropic layer may be transferred to another substrate and used.

Next, an example of the optical element according to the embodiment of the present invention that is prepared using the manufacturing method according to the embodiment of the present invention will be described using FIGS. 1 and 2.

<Optical Element>

FIG. 1 is a side view conceptually showing an example of the optical element according to the embodiment of the present invention. FIG. 2 is a plan view showing the optical element shown in FIG. 1. The plan view is a view in a case where the optical element 10 is seen from the top in FIG. 1, that is, a view in a case where the optical element 10 is seen from a thickness direction (laminating direction of the respective layers (films)). In other words, the plan view is a view in a case where the optically-anisotropic layer 26 is seen from a direction perpendicular to a main surface.

In addition, in FIG. 2, in order to clarify the configuration of the optical element 10 according to the embodiment of the present invention, only the liquid crystal compound 30 on the surface of the alignment film 24 is shown. However, in the thickness direction, as shown in FIG. 1, the optically-anisotropic layer 26 has the structure in which the liquid crystal compound 30 is laminated on the surface of the alignment film 24.

The optical element 10 shown in FIG. 1 includes the support 20, the alignment film 24, and the optically-anisotropic layer 26. The optically-anisotropic layer 26 has a predetermined liquid crystal alignment pattern in which an optical axis derived from the liquid crystal compound continuously rotates in one in-plane direction, the liquid crystal alignment pattern being formed using the composition including the liquid crystal compound.

<<Alignment Film>>

The alignment film 24 is formed on the surface of the support 20.

The alignment film 24 is an alignment film for aligning the liquid crystal compound 30 to the predetermined liquid crystal alignment pattern during the formation of the optically-anisotropic layer 26. As described above, in the optical element 10 according to the embodiment of the present invention, the optically-anisotropic layer 26 has a liquid crystal alignment pattern in which a direction of an optical axis 30A (refer to FIG. 2) derived from the liquid crystal compound 30 changes while continuously rotating in one in-plane direction (arrow X direction described below). Accordingly, the alignment film of each of the optically-anisotropic members is formed such that the optically-anisotropic layer can form the liquid crystal alignment pattern.

In the optical element according to the embodiment of the present invention, in a case where a length over which the direction of the optical axis 30A rotates by 180° in the in-plane direction in which the direction of the optical axis 30A changes while continuously rotating in the liquid crystal alignment pattern is set as a single period (a rotation period of the optical axis, symbol Λ in FIG. 2), the optically-anisotropic layer has regions having different lengths of the single periods of the liquid crystal alignment patterns in a plane.

<<Optically-Anisotropic Layer>>

The optically-anisotropic layer 26 is formed on the surface of the alignment film 24. As described above, in the optical element 10 according to the embodiment of the present invention, the optically-anisotropic layer 26 is formed using the liquid crystal composition including the liquid crystal compound.

In a case where an in-plane retardation value is set as λ/2, the optically-anisotropic layer 26 has a function of a general λ/2 plate, that is, a function of imparting a phase difference of a half wavelength, that is, 180° to two linearly polarized light components in light incident into the optically-anisotropic layer and are perpendicular to each other.

As shown in FIG. 2, The optically-anisotropic layer 26 has the liquid crystal alignment pattern in which the direction of the optical axis 30A derived from the liquid crystal compound 30 changes while continuously rotating in one direction indicated by arrow X in a plane of the optically-anisotropic layer 26.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction.

In the following description, "one direction indicated by arrow X" will also be simply referred to as "arrow X direction". In addition, in the following description, the optical axis 30A derived from the liquid crystal compound 30 will also be referred to as "the optical axis 30A of the liquid crystal compound 30" or "the optical axis 30A".

In the optically-anisotropic layer 26, the liquid crystal compound 30 is two-dimensionally aligned in a plane parallel to the arrow X direction and a Y direction perpendicular to the arrow X direction. In FIGS. 1 and 3 and FIGS. 6, 7, 10, and 11 described below, the Y direction is a direction perpendicular to the paper plane.

FIG. 2 conceptually shows a plan view of the optically-anisotropic layer 26.

The optically-anisotropic layer 26 has the liquid crystal alignment pattern in which the direction of the optical axis 30A derived from the liquid crystal compound 30 changes while continuously rotating in the arrow X direction in a plane of the optically-anisotropic layer 26.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from θ to θ+180° or θ−180° in the arrow X direction.

A difference between the angles of the optical axes 30A of the liquid crystal compound 30 adjacent to each other in the arrow X direction is preferably 45° or less, more preferably 15° or less, and still more preferably less than 15°.

On the other hand, regarding the liquid crystal compound 30 forming the optically-anisotropic layer 26, the liquid crystal compounds 30 having the same direction of the optical axes 30A are arranged at regular intervals in the Y direction perpendicular to the arrow X direction, that is, the Y direction perpendicular to the in-plane direction in which the optical axis 30A continuously rotates.

In other words, regarding the liquid crystal compound 30 forming the optically-anisotropic layer 26, in the liquid crystal compounds 30 arranged in the Y direction, angles between the directions of the optical axes 30A and the arrow X direction are the same.

In the optical element 10 according to the embodiment of the present invention, in the liquid crystal alignment pattern of the liquid crystal compound 30, the length (distance) over which the optical axis 30A of the liquid crystal compound 30 rotates by 180° in the arrow X direction in which the direction of the optical axis 30A changes while continuously rotating in a plane is the length Λ of the single period in the liquid crystal alignment pattern. In other words, the length of the single period in the liquid crystal alignment pattern is defined as the distance between θ and θ+180° that is a range of the angle between the optical axis 30A of the liquid crystal compound 30 and the arrow X direction.

That is, a distance between centers of two liquid crystal compounds 30 in the arrow X direction is the length Λ of the single period, the two liquid crystal compounds having the same angle in the arrow X direction. Specifically, as shown in FIG. 2, a distance of centers of two liquid crystal compounds 30 in which the arrow X direction and the direction of the optical axis 30A match each other in the arrow X direction is the length Λ of the single period. In the following description, the length Λ of the single period will also be referred to as "single period Λ".

In the optical element 10 according to the embodiment of the present invention, in the liquid crystal alignment pattern of the optically-anisotropic layer, the single period Λ is repeated in the arrow X direction, that is, in the in-plane direction in which the direction of the optical axis 30A changes while continuously rotating.

As described above, in the liquid crystal compounds arranged in the Y direction in the optically-anisotropic layer, the angles between the optical axes 30A and the arrow X direction (the in-plane direction in which the direction of the optical axis of the liquid crystal compound 30 rotates) are the same. Regions where the liquid crystal compounds 30 in which the angles between the optical axes 30A and the arrow X direction are the same are arranged in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 30 in the direction of the optical axis 30A and a refractive index of the liquid crystal compound 30 in a direction perpendicular to the optical axis 30A in a plane of the region R. That is, the difference Δn in refractive index is the same as the difference in refractive index of the liquid crystal compound.

In a case where circularly polarized light is incident into the above-described optically-anisotropic layer 26, the light is refracted such that the direction of the circularly polarized light is converted.

Figure 6:
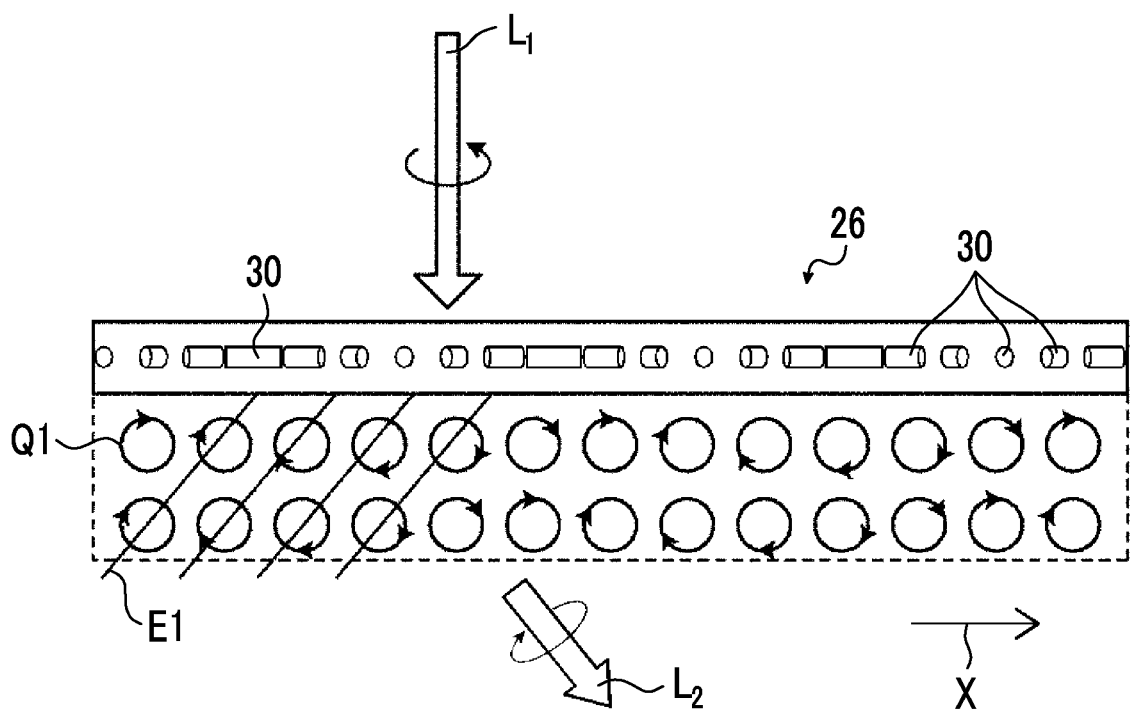
FIG. 6 is a conceptual diagram showing an action of the optically-anisotropic layer of the optical element shown in FIG. 1.

This action is conceptually shown in FIG. 6 using the optically-anisotropic layer 26 as an example. In the optically-anisotropic layer 26, the value of the product of the difference in refractive index of the liquid crystal compound and the thickness of the optically-anisotropic layer is λ/2.

As shown in FIG. 6, in a case where the value of the product of the difference in refractive index of the liquid crystal compound and the thickness of the optically-anisotropic layer in the optically-anisotropic layer 26 is λ/2 and incidence light $L_1$ as left circularly polarized light is incident into the optically-anisotropic layer 26, the incidence light $L_1$ transmits through the optically-anisotropic layer 26 to be imparted with a phase difference of 180°, and the transmitted light $L_2$ is converted into right circularly polarized light.

In addition, in a case where the incidence light $L_1$ transmits through the optically-anisotropic layer 26, an absolute phase thereof changes depending on the direction of the optical axis 30A of each of the liquid crystal compounds 30. At this time, the direction of the optical axis 30A changes while rotating in the arrow X direction. Therefore, the amount of change in the absolute phase of the incidence light $L_1$ varies depending on the direction of the optical axis 30A. Further, the liquid crystal alignment pattern that is formed in the optically-anisotropic layer 26 is a pattern that is periodic in the arrow X direction. Therefore, as shown in FIG. 6, the incidence light $L_1$ transmitted through the optically-anisotropic layer 26 is imparted with an absolute phase Q1 that is periodic in the arrow X direction corresponding to the direction of each of the optical axes 30A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

Figure 7:
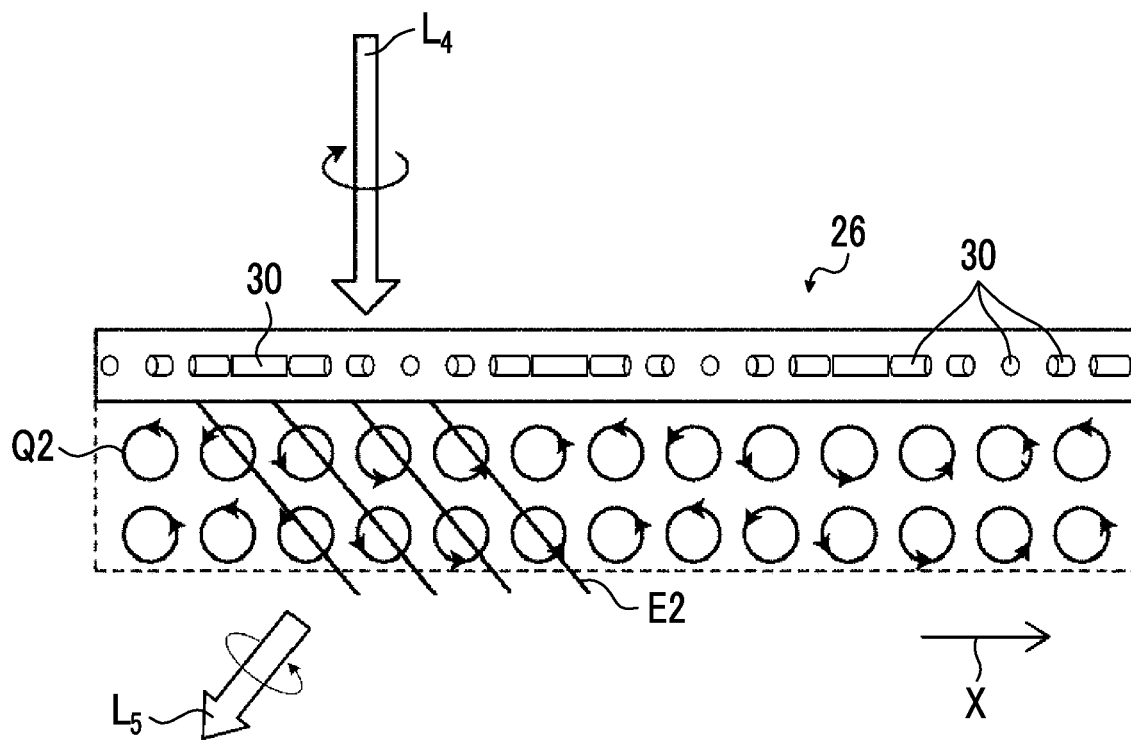
FIG. 7 is a conceptual diagram showing the action of the optically-anisotropic layer of the optical element shown in FIG. 1.

On the other hand, as conceptually shown in FIG. 7, in a case where the value of the product of the difference in refractive index of the liquid crystal compound and the thickness of the optically-anisotropic layer in the optically-anisotropic layer 26 is μ/2 and incidence light $L_4$ as right circularly polarized light is incident into the optically-anisotropic layer 26, the incidence light $L_4$ transmits through the optically-anisotropic layer 26 to be imparted with a phase difference of 180° and is converted into transmitted light $L_5$ of left circularly polarized light.

In addition, in a case where the incidence light $L_4$ transmits through the optically-anisotropic layer 26, an absolute phase thereof changes depending on the direction of the optical axis 30A of each of the liquid crystal compounds 30. At this time, the direction of the optical axis 30A changes while rotating in the arrow X direction. Therefore, the amount of change in the absolute phase of the incidence light $L_4$ varies depending on the direction of the optical axis 30A. Further, the liquid crystal alignment pattern that is formed in the optically-anisotropic layer 26 is a pattern that is periodic in the arrow X direction. Therefore, as shown in FIG. 7, the incidence light $L_4$ transmitted through the optically-anisotropic layer 26 is imparted with an absolute phase Q2 that is periodic in the arrow X direction corresponding to the direction of each of the optical axes 30A.

Here, the incidence light $L_4$ is right circularly polarized light. Therefore, the absolute phase Q2 that is periodic in the arrow X direction corresponding to the direction of the optical axis 30A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

In the optically-anisotropic layer 26, it is preferable that the in-plane retardation value of the plurality of regions R is a half wavelength. It is preferable that an in-plane retardation $Re(550)=\Delta n_{550} \times d$ of the plurality of regions R of the optically-anisotropic layer 26 with respect to the incidence light having a wavelength of 550 nm is in a range defined by the following Expression (1). Here, $\Delta n_{550}$ represents a difference in refractive index generated by refractive index anisotropy of the region R in a case where the wavelength of incidence light is 550 nm, and d represents the thickness of the optically-anisotropic layer 26.

$$200 \text{ nm} \leq \Delta n_{550} \times d \leq 350 \text{ nm} \quad (1).$$

That is, in a case where the in-plane retardation $Re(550)=\Delta n_{550} \times d$ of the plurality of regions R of the optically-anisotropic layer 26 satisfies Expression (1), a sufficient amount of a circularly polarized light component in light incident into the optically-anisotropic layer 26 can be converted into circularly polarized light that travels in a direction tilted in a forward direction or reverse direction with respect to the arrow X direction. It is more preferable that the in-plane retardation $Re(550)=\Delta n_{550} \times d$ satisfies $225 \text{ nm} \leq \Delta n_{550} \times d \leq 340 \text{ nm}$, and it is still more preferable that the in-plane retardation $Re(550)=\Delta n_{550} \times d$ satisfies $250 \text{ nm} \leq \Delta n_{550} \times d \leq 330 \text{ nm}$.

Expression (1) is a range with respect to incidence light having a wavelength of 550 nm. However, an in-plane retardation $Re(\lambda)=\Delta m_\lambda \times d$ of the plurality of regions R of the optically-anisotropic layer with respect to incidence light having a wavelength of λ nm is preferably in a range defined by the following Expression (1-2) and can be appropriately set.

$$0.7\lambda \text{ nm} \leq \Delta n_\lambda \times d \leq 1.3\lambda \text{ nm} \quad (1\text{-}2)$$

In addition, the value of the in-plane retardation of the plurality of regions R of the optically-anisotropic layer 26 in a range outside the range of Expression (1) can also be used. Specifically, by satisfying $\Delta n_{550} \times d < 200$ nm or $350 \text{ nm} < \Delta n_{550} \times d$, the light can be classified into light that travels in the same direction as a traveling direction of the incidence light and light that travels in a direction different from a traveling direction of the incidence light. In a case where $\Delta n_{550} \times d$ approaches 0 nm or 550 nm, the amount of the light component that travels in the same direction as a traveling direction of the incidence light increases, and the amount of the light component that travels in a direction different from a traveling direction of the incidence light decreases.

Further, it is preferable that an in-plane retardation $Re(450)=\Delta n_{450} \times d$ of each of the plurality of regions R of the optically-anisotropic layer 26 with respect to incidence light having a wavelength of 450 nm and an in-plane retardation $Re(550)=\Delta n_{550} \times d$ of each of the plurality of regions R of the optically-anisotropic layer 26 with respect to incidence light having a wavelength of 550 nm satisfy the following Expression (2). Here, $\Delta n_{450}$ represents a difference in refractive index generated by refractive index anisotropy of the region R in a case where the wavelength of incidence light is 450 nm.

$$(\Delta n_{450} \times d)/(\Delta n_{550} \times d) < 1.0 \quad (2)$$

Expression (2) represents that the liquid crystal compound 30 in the optically-anisotropic layer 26 has reverse dispersion properties. That is, by satisfying Expression (2), the optically-anisotropic layer 26 can correspond to incidence light having a wide range of wavelength.

Here, by changing the single period Λ of the liquid crystal alignment pattern formed in the optically-anisotropic layer 26, refraction angles of the transmitted light components $L_2$ and $L_5$ can be adjusted. Specifically, as the single period Λ of the liquid crystal alignment pattern decreases, light components transmitted through the liquid crystal compounds 30 adjacent to each other more strongly interfere with each other. Therefore, the transmitted light components $L_2$ and $L_5$ can be more largely refracted.

In addition, refraction angles of the transmitted light components $L_2$ and $L_5$ with respect to the incidence light components $L_1$ and $L_4$ vary depending on the wavelengths of the incidence light components $L_1$ and $L_4$ (the transmitted light components $L_2$ and $L_5$). Specifically, as the wavelength of incidence light increases, the transmitted light is largely refracted. That is, in a case where incidence light is red light, green light, and blue light, the red light is refracted to the highest degree, and the blue light is refracted to the lowest degree.

Further, by reversing the rotation direction of the optical axis 30A of the liquid crystal compound 30 that rotates in the arrow X direction, the refraction direction of transmitted light can be reversed.

The optically-anisotropic layer is formed of a cured layer of a liquid crystal composition including a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above.

By forming an alignment film on the support 20, applying the liquid crystal composition to the alignment film, and curing the applied liquid crystal composition, the optically-anisotropic layer consisting of the cured layer of the liquid crystal composition can be obtained. Although the optically-anisotropic layer functions as a so-called λ/2 plate, the present invention also includes an aspect where a laminate including the support 20 and the alignment film that are integrated functions as a so-called λ/2 plate.

In addition, the liquid crystal composition for forming the optically-anisotropic layer includes a rod-shaped liquid crystal compound or a disk-shaped liquid crystal compound and may further include other components such as a leveling agent, an alignment controller, a polymerization initiator, a crosslinking agent, or an alignment assistant. In addition, the liquid crystal composition may include a solvent.

In addition, it is preferable that the optically-anisotropic layer has a wide range for the wavelength of incidence light and is formed of a liquid crystal material having a reverse birefringence dispersion. In addition, it is also preferable that the optically-anisotropic layer can be made to have a substantially wide range for the wavelength of incidence light by imparting a twist component to the liquid crystal composition or by laminating different phase difference layers. For example, in the optically-anisotropic layer, a method of realizing a λ/2 plate having a wide-range pattern by laminating two liquid crystal layers having different twisted directions is disclosed in, for example, JP2014-089476A and can be preferably used in the present invention.

—Rod-Shaped Liquid Crystal Compound—

As the rod-shaped liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-shaped liquid crystal compound, not only the above-described low molecular weight liquid crystal molecules but also high molecular weight liquid crystal molecules can be used.

It is preferable that the alignment of the rod-shaped liquid crystal compound is immobilized by polymerization. Examples of the polymerizable rod-shaped liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-064627. Further, as the rod-shaped liquid crystal compound, for example, compounds described in JP1999-513019A (JP-H11-513019A) and JP2007-279688A can be preferably used.

—Disk-Shaped Liquid Crystal Compound—

As the disk-shaped liquid crystal compound, for example, compounds described in JP2007-108732A and JP2010-244038A can be preferably used.

In a case where the disk-shaped liquid crystal compound is used in the optically-anisotropic layer, the liquid crystal compound 30 rises in the thickness direction in the optically-anisotropic layer, and the optical axis 30A derived from the liquid crystal compound is defined as an axis perpendicular to a disk plane, that is so-called, a fast axis.

In the optical element according to the embodiment of the present invention, it is not necessary that the 180° rotation period in the optically-anisotropic layer is uniform over the entire surface. That is, the optically-anisotropic layer may have regions having different lengths of the 180° rotation period in a plane.

In addition, the optically-anisotropic layer may have a portion where the direction of the optical axis is constant as long as a part thereof has the liquid crystal alignment pattern in which the direction of the optical axis rotates in at least one in-plane direction.

In the optical elements shown in FIGS. 1 and 2, the optical axis 30A of the liquid crystal compound 30 in the liquid crystal alignment pattern of the optically-anisotropic layer continuously rotates only in the arrow X direction.

However, the present invention is not limited thereto, and various configurations can be used as long as the optical axis 30A of the liquid crystal compound 30 in the optically-anisotropic layer continuously rotates in the in-plane direction.

Figure 8:
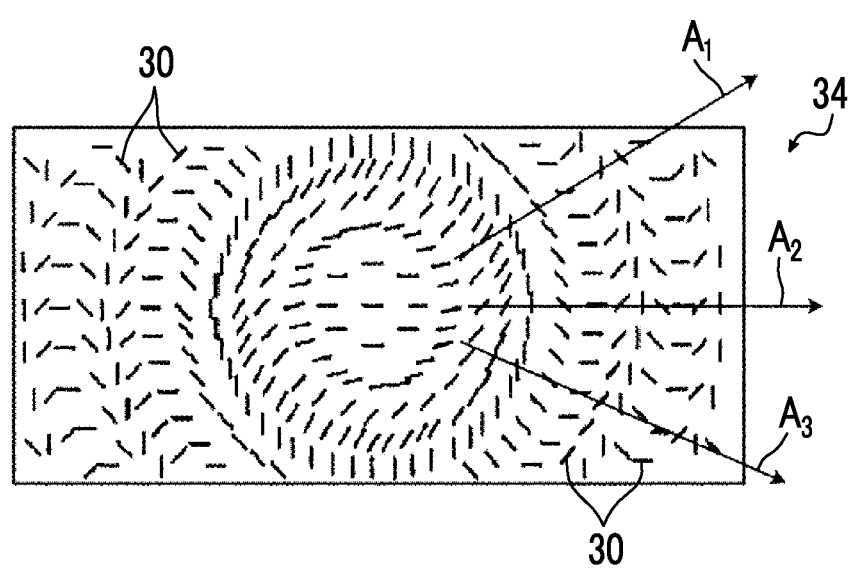
FIG. 8 is a plan view showing another example of the optically-anisotropic layer of the optical element according to the present invention.

For example, an optically-anisotropic layer 34 conceptually shown in a plan view of FIG. 8 can be used, in which a liquid crystal alignment pattern is a concentric circular pattern having a concentric circular shape where the in-plane direction in which the direction of the optical axis of the liquid crystal compound 30 changes while continuously rotating moves from an inside toward an outside. In other words, the liquid crystal alignment pattern of the optically-anisotropic layer 34 shown in FIG. 8 is a liquid crystal alignment pattern where the in-plane direction in which the direction of the optical axis of the liquid crystal compound 30 changes while continuously rotating is provided in a radial shape from the center of the optically-anisotropic layer 34.

FIG. 8 shows only the liquid crystal compound 30 of the surface of the alignment film as in FIG. 2. However, as shown in FIG. 1, the optically-anisotropic layer 34 has the structure in which the liquid crystal compound 30 on the surface of the alignment film is laminated as described above.

In the optically-anisotropic layer 34 shown in FIG. 8, the optical axis (not shown) of the liquid crystal compound 30 is a longitudinal direction of the liquid crystal compound 30.

In the optically-anisotropic layer 34, the direction of the optical axis of the liquid crystal compound 30 changes while continuously rotating in a direction in which a large number of optical axes move to the outside from the center of the optically-anisotropic layer 34, for example, a direction indicated by an arrow A1, a direction indicated by an arrow A2, a direction indicated by an arrow A3, or . . . .

In circularly polarized light incident into the optically-anisotropic layer 34 having the above-described liquid crystal alignment pattern, the absolute phase changes depending on individual local regions having different directions of optical axes of the liquid crystal compound 30. At this time, the amount of change in absolute phase varies depending on the directions of the optical axes of the liquid crystal compound 30 into which circularly polarized light is incident.

This way, in the optically-anisotropic layer 34 having the concentric circular liquid crystal alignment pattern, that is, the liquid crystal alignment pattern in which the optical axis changes while continuously rotating in a radial shape, transmission of incidence light can be allowed as diverging light or converging light depending on the rotation direction of the optical axis of the liquid crystal compound 30 and the direction of circularly polarized light to be incident.

That is, by setting the liquid crystal alignment pattern of the optically-anisotropic layer in a concentric circular shape, the optical element according to the embodiment of the present invention exhibits, for example, a function as a convex lens or a concave lens.

Here, in a case where the liquid crystal alignment pattern of the optically-anisotropic layer is concentric circular such that the optical element functions as a convex lens, it is preferable that the length of the single period Λ over which the optical axis rotates by 180° in the liquid crystal alignment pattern gradually decreases from the center of the optically-anisotropic layer 34 toward the outer direction in the in-plane direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 34 toward the outer direction in the in-plane direction in which the optical axis continuously rotates. As a result, the light collecting power of the optically-anisotropic layer 34 can be improved, and the performance as a convex lens can be improved.

In the present invention, depending on the uses of the optical element such as a concave lens, it is preferable that the length of the single period Λ over which the optical axis rotates by 180° in the liquid crystal alignment pattern gradually decreases from the center of the optically-anisotropic layer 34 toward the outer direction in the in-plane direction by reversing the direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 34 toward the outer direction in the in-plane direction in which the optical axis continuously rotates. As a result, the light diverging power of the optically-anisotropic layer 34 can be improved, and the performance as a concave lens can be improved.

In the present invention, for example, in a case where the optical element is used as a concave lens, it is preferable that the turning direction of incident circularly polarized light is reversed.

In the present invention, in a case where the optical element is made to function as a convex lens or a concave lens, it is preferable that the optical element satisfies the following expression.

$$\Phi(r)=(\pi/\mu)[[r^2+f^2]^{1/2}-f]$$

Here, r represents a distance from the center of a concentric circle and is represented by the following expression "$r=(x^2+y^2)^{1/2}$". x and y represent in-plane positions, and (x,y)=(0,0) represents the center of the concentric circle. $\Phi(r)$ represents an angle of the optical axis at the distance r from the center, λ represents a wavelength, and f represents a designed focal length.

In the present invention, conversely, the length of the single period Λ in the concentric circular liquid crystal alignment pattern may gradually increase from the center of the optically-anisotropic layer 34 toward the outer direction in the in-plane direction in which the optical axis continuously rotates.

Further, depending on the uses of the optical element such as a case where it is desired to provide a light amount distribution in transmitted light, a configuration in which regions having partially different lengths of the single periods Λ in the in-plane direction in which the optical axis continuously rotates are provided can also be used instead of the configuration in which the length of the single period Λ gradually changes in the in-plane direction in which the optical axis continuously rotates.

Further, the optical element according to the embodiment of the present invention may include: an optically-anisotropic layer in which the single period Λ is homogeneous over the entire surface; and an optically-anisotropic layer in which regions having different lengths of the single periods Λ are provided.

Figure 9:
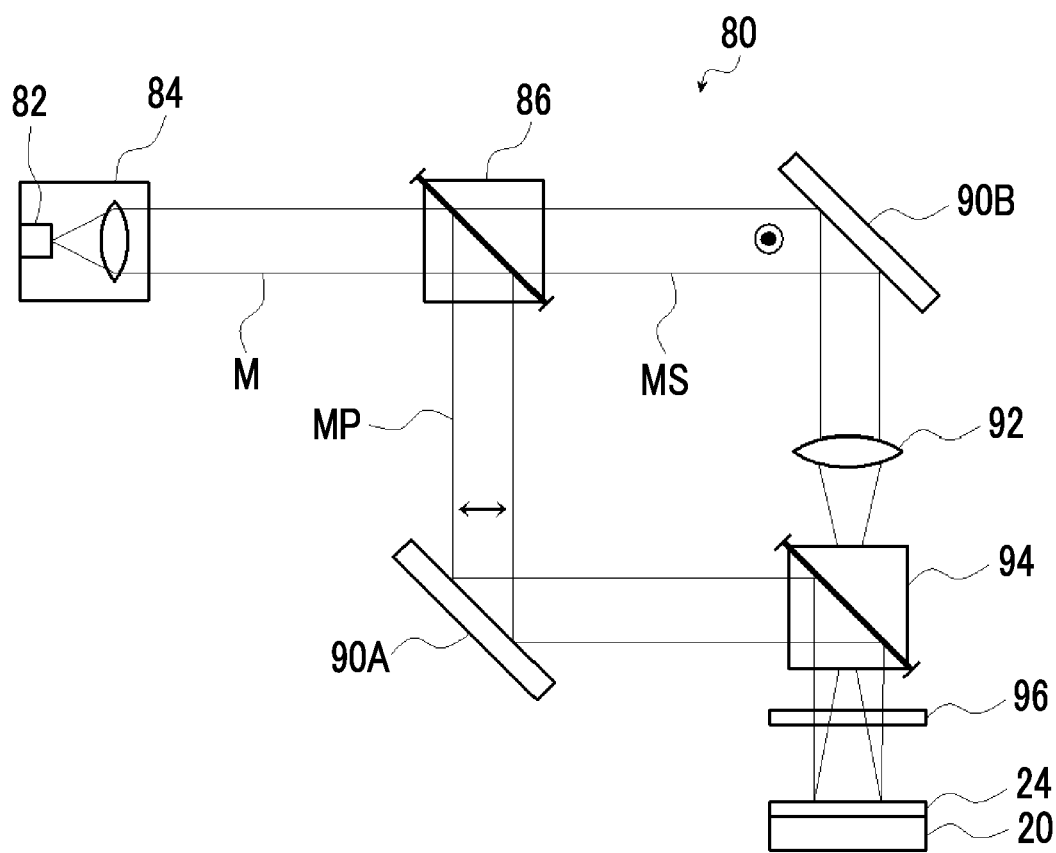
FIG. 9 is a diagram conceptually showing one example of an exposure device that exposes an alignment film forming the optically-anisotropic layer shown in FIG. 8.

FIG. 9 conceptually shows an example of an exposure device that forms the concentric circular alignment pattern in the alignment film 24.

An exposure device 80 includes: a light source 84 that includes a laser 82; a polarization beam splitter 86 that splits the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 24 on the support 20.

Due to interference between the right circularly polarized light and the left circularly polarized light, the polarization state of light with which the alignment film 24 is irradiated periodically changes according to interference fringes. The intersecting angle between the right circularly polarized light and the left circularly polarized light changes from the inside to the outside of the concentric circle. Therefore, an exposure pattern in which the pitch changes from the inside to the outside can be obtained. As a result, in the alignment film 24, a concentric circular alignment pattern in which the alignment state periodically changes can be obtained.

In the exposure device 80, the single period Λ in the liquid crystal alignment pattern in which the optical axis of the liquid crystal compound 30 continuously rotates by 180° in the in-plane direction can be controlled by changing the refractive power of the lens 92 (the F number of the lens 92), the focal length of the lens 92, the distance between the lens 92 and the alignment film 24, and the like.

In addition, by adjusting the refractive power of the lens 92 (the F number of the lens 92), the length Λ of the single period in the liquid crystal alignment pattern in the in-plane direction in which the optical axis continuously rotates can be changed.

Specifically, In addition, the length Λ of the single period in the liquid crystal alignment pattern in the in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length Λ of the single period in the liquid crystal alignment pattern gradually decreases from the inside toward the outside, and the F number increases. Conversely, in a case where the refractive power of the lens 92 becomes stronger, the length Λ of the single period in the liquid crystal alignment pattern rapidly decreases from the inside toward the outside, and the F number decreases.

This way, the configuration of changing the length of the single period Λ over which the optical axis rotates by 180° in the in-plane direction in which the optical axis continuously rotates can also be used in the configuration shown in FIGS. 1 and 2 in which the optical axis 30A of the liquid crystal compound 30 continuously rotates only in the in-plane direction as the arrow X direction.

For example, by gradually decreasing the single period Λ of the liquid crystal alignment pattern in the arrow X direction, an optical element that allows transmission of light to be collected can be obtained. In addition, by reversing the direction in which the optical axis in the liquid crystal alignment pattern rotates by 180°, an optical element that allows transmission of light to be diffused only in the arrow X direction can be obtained. By reversing the turning direction of incident circularly polarized light, an optical element that allows transmission of light to be diffused only in the arrow X direction can be obtained.

Further, depending on the uses of the optical element such as a case where it is desired to provide a light amount distribution in transmitted light, a configuration in which regions having partially different lengths of the single periods Λ in the arrow X direction are provided can also be used instead of the configuration in which the length of the single period Λ gradually changes in the arrow X direction. For example, as a method of partially changing the single period Λ, for example, a method of scanning and exposing the photo-alignment film to be patterned while freely changing a polarization direction of laser light to be collected can be used.

In addition, the optical element according to the embodiment of the present invention may include a plurality of optically-anisotropic layers 26. In a case where the optical element includes a plurality of optically-anisotropic layers, the single periods Λ of the liquid crystal alignment patterns of the optically-anisotropic layers may be the same as or different from each other. In addition, the liquid crystal alignment patterns may vary depending on the optically-anisotropic layers.

In the optical element according to the embodiment of the present invention, the single period Λ in the alignment pattern of the optically-anisotropic layer is not particularly limited and may be appropriately set depending on the use of the optical element and the like.

Here, the optical element according to the embodiment of the present invention can be suitably used as, for example, a diffraction element that refracts light displayed by a display to be introduced into a light guide plate or a diffraction element that refracts light propagated in a light guide plate to be emitted to an observation position by a user from the light guide plate in AR glasses. In particular, the optical element 10 that can handle with a full color image can be suitably used as a diffraction element in AR glasses.

In this case, in order to totally reflect light from the light guide plate, it is necessary to refract light to be introduced into the light guide plate at a large angle to some degree with respect to incidence light. In addition, in order to reliably emit light propagated in the light guide plate, it is necessary to refract light at a large angle to some degree with respect to incidence light.

In addition, as described above, regarding the transmission angle of light through the optically-anisotropic layer, the angle of transmitted light with respect to incidence light can be increased by reducing the single period Λ in the liquid crystal alignment pattern.

In consideration of this point, the single period Λ in the liquid crystal alignment pattern of the optically-anisotropic layer is preferably 20 μm or less, more preferably 10 μm or less, and still more preferably 5 μm or less.

In a case where light is diffracted at a greater angle, the single period Λ is more preferably 3 μm or less and still more preferably 1 μm or less.

In consideration of the accuracy of the liquid crystal alignment pattern and the like, the single period Λ in the liquid crystal alignment pattern of the optically-anisotropic layer is preferably 0.1 μm or more.

In addition, in the example shown in FIG. 1, in the optically-anisotropic layer, the liquid crystal compounds are arranged in the thickness direction such that the optical axes are arranged in the same direction, but the embodiment is not limited thereto. The optically-anisotropic layer may have a region where alignment of the liquid crystal compound has twisting properties in the thickness direction. In addition, the optically-anisotropic layer may have cholesteric alignment.

Figure 10:
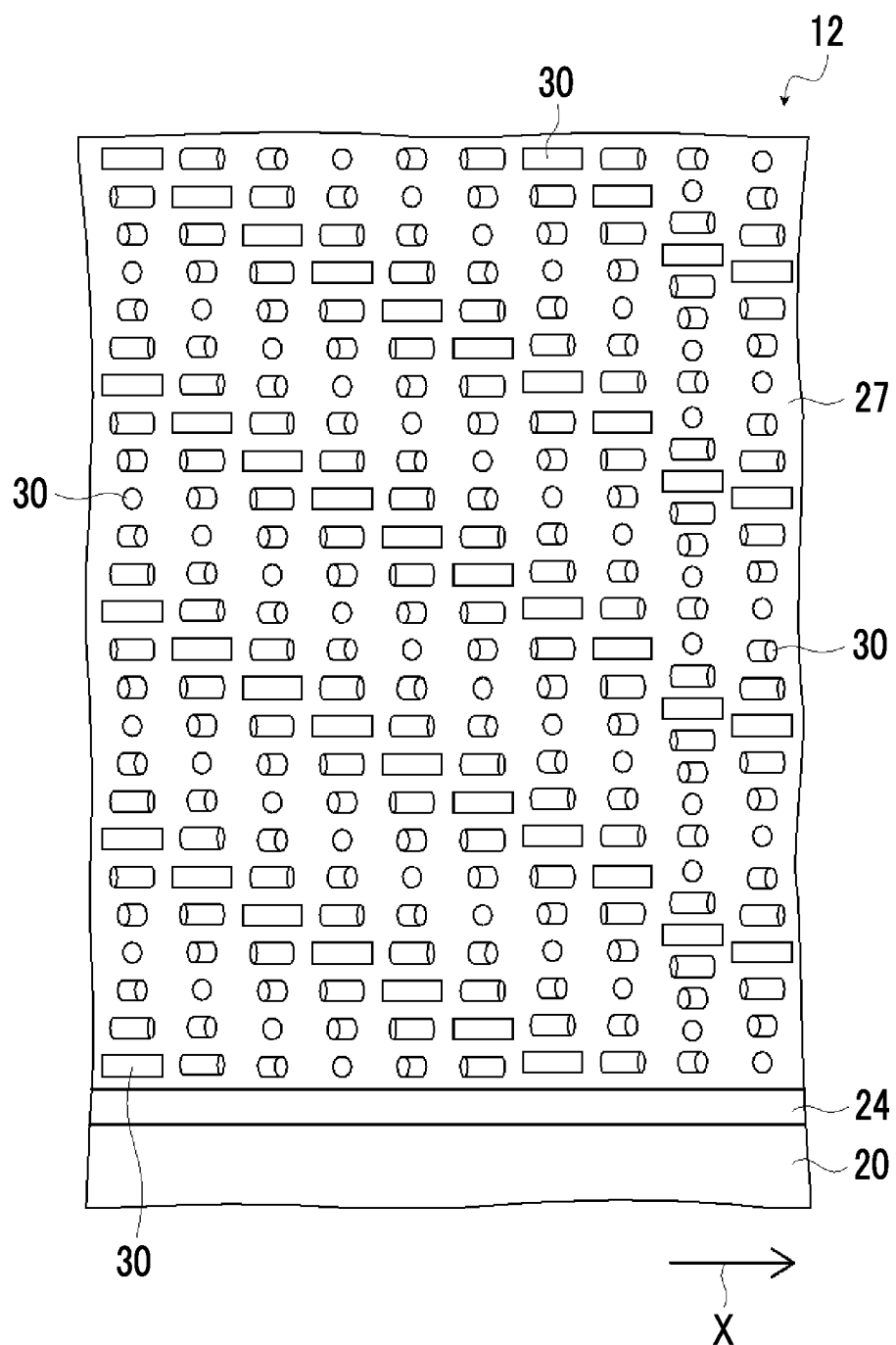
FIG. 10 is a diagram conceptually showing still another example of the optical element according to the present invention prepared in the manufacturing method according to the present invention.
Figure 11:
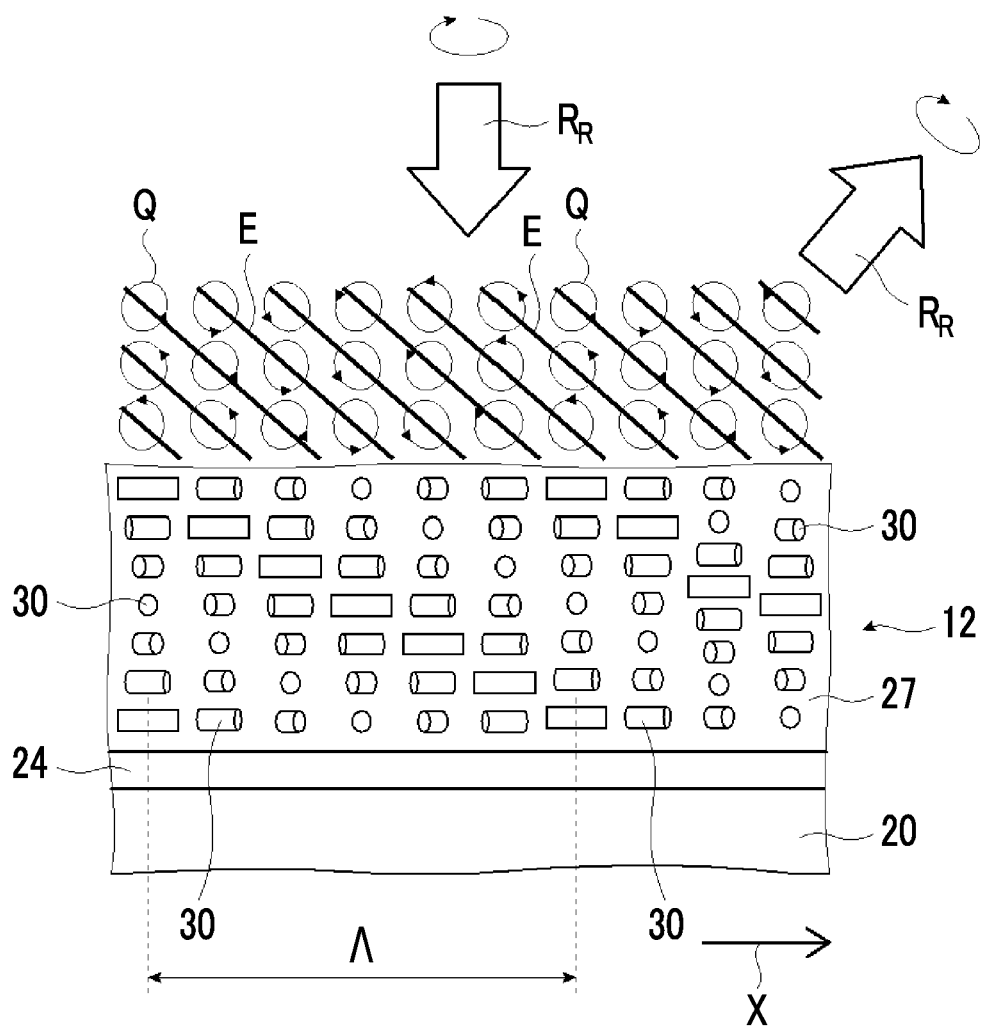
FIG. 11 is a conceptual diagram showing an action of the optical element shown in FIG. 10.

In the example shown in FIG. 10, the optically-anisotropic layer has cholesteric alignment.

In an optical element 12 shown in FIG. 10, the optically-anisotropic layer 26 has a helical structure in which the liquid crystal compound 30 is helically twisted and laminated in the thickness direction as in a cholesteric liquid crystal layer obtained by immobilizing a typical cholesteric liquid crystalline phase. In the helical structure, a configuration in which the liquid crystal compound 30 is helically rotated once (rotated by 360) and laminated is set as one helical pitch, and plural pitches of the helically twisted liquid crystal compound 30 are laminated.

On the other hand, as in the example shown in FIG. 2, the optically-anisotropic layer 26 has a liquid crystal alignment pattern in which a direction of an optical axis derived from the liquid crystal compound changes while continuously rotating in at least one in-plane direction.

An optically-anisotropic layer 27 having the cholesteric alignment has wavelength selective reflection properties as in a cholesteric liquid crystal layer of the related art. For example, in a case where the optically-anisotropic layer 27 having cholesteric alignment reflects right circularly polarized light of red light, the optically-anisotropic layer 27 reflects right circularly polarized light in a red wavelength range and allows transmission of the other light.

On the other hand, in the optically-anisotropic layer 27, the liquid crystal compound 30 rotates in the in-plane direction and is aligned. Therefore, the reflected light is diffracted.

Accordingly, the optical element 12 including the optically-anisotropic layer 27 having cholesteric alignment reflects right circularly polarized light or left circularly polarized light having a selective reflection wavelength and diffracts the reflected light.

In the following description, the optically-anisotropic layer having cholesteric alignment will also be referred to as "cholesteric liquid crystal layer".

In an optical element 12 shown in FIG. 10, the configurations of the support 20 and the alignment film 24 have the same configurations as those of the support 20 and the alignment film 24 in the optical element 10 shown in FIG. 1, and thus the description thereof will not be repeated.

That is in the optical element shown in FIG. 10, the alignment film 24 is a photo-alignment film and is exposed to two or more polarized beams that are caused to interfere with each other. Due to this exposure, the alignment pattern is formed on the alignment film 24 such that the optically-anisotropic layer 27 can form the liquid crystal alignment pattern in which the direction of the optical axis 30A derived from the liquid crystal compound 30 changes while continuously rotating in the in-plane direction.

<Cholesteric Liquid Crystal Layer>

A cholesteric liquid crystal layer 27 is obtained by immobilizing a cholesteric liquid crystalline phase. That is, the cholesteric liquid crystal layer 27 is a layer formed of the liquid crystal compound 30 (liquid crystal material) having a cholesteric structure.

<<Cholesteric Liquid Crystalline Phase>>

The cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

Accordingly, in the optical element 12 shown in FIG. 10, the cholesteric liquid crystal layer is a layer obtained by immobilizing a right-twisted cholesteric liquid crystalline phase.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection range (circularly polarized light reflection range) where selective reflection is exhibited depends on $\Delta n$ of the cholesteric liquid crystalline phase and the helical pitch P and complies with a relationship of $\Delta\lambda = \Delta n \times P$. Therefore, the width of the selective reflection range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical element 10 and is, for example, 10 to 500 nm and preferably 20 to 300 nm and more preferably 30 to 100 nm.

<<Method of Forming Cholesteric Liquid Crystal Layer>>

The cholesteric liquid crystal layer 27 can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the aligned state is not changed by an external field or an external force.

The structure in which a cholesteric liquid crystalline phase is immobilized is not particularly limited as long as the optical properties of the cholesteric liquid crystalline phase are maintained, and the liquid crystal compound 30 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-80081A (JP-H11-80081A), and JP2001-328973A. Further, as the rod-shaped liquid crystal compound, for example, compounds described in JP1999-513019A (JP-H11-513019A) and JP2007-279688A can be preferably used. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the cholesteric liquid crystal layer 27 is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the cholesteric liquid crystal layer is formed, the cholesteric liquid crystal layer is formed by applying the liquid crystal composition to the alignment film, aligning the liquid crystal compound to a state of a cholesteric liquid crystalline phase, and curing the liquid crystal compound.

An application method is as described above.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

A curing method is as described above.

<<Liquid Crystal Alignment Pattern of Cholesteric Liquid Crystal Layer>>

As described above, in the optical element 12 according to the embodiment of the present invention, the cholesteric liquid crystal layer 27 has the liquid crystal alignment pattern in which the direction of the optical axis 30A derived from the liquid crystal compound 30 forming the cholesteric liquid crystalline phase changes while continuously rotating in the in-plane direction of the cholesteric liquid crystal layer 27.

In the cholesteric liquid crystal layer 27, as in the optically-anisotropic layer 26 shown in FIG. 2, on the surface of the alignment film 24, the liquid crystal compound 30 forming the cholesteric liquid crystal layer 27 is two-dimensionally arranged according to the alignment pattern formed on the alignment film 24 as the lower layer in a predetermined in-plane direction indicated by arrow X and a direction perpendicular to the in-plane direction (arrow X direction).

In addition, the liquid crystal compound 30 forming the cholesteric liquid crystal layer 27 has the liquid crystal alignment pattern in which the direction of the optical axis 30A changes while continuously rotating in the arrow X direction in a plane of the cholesteric liquid crystal layer 27. In the example shown in the drawing, the liquid crystal compound 30 has the liquid crystal alignment pattern in which the optical axis 30A of the liquid crystal compound 30 changes while continuously rotating clockwise in the arrow X direction.

As described above, a difference between the angles of the optical axes 30A of the liquid crystal compound 30 adjacent to each other in the arrow X direction is preferably 45° or less, more preferably 15° or less, and still more preferably less than 15°.

On the other hand, in the liquid crystal compound 30 forming the cholesteric liquid crystal layer 27, the directions of the optical axes 30A are the same in the Y direction perpendicular to the arrow X direction, that is, the Y direction perpendicular to the in-plane direction in which the optical axis A continuously rotates.

In other words, in the liquid crystal compound 30 forming the cholesteric liquid crystal layer 27, angles between the optical axes 30A of the liquid crystal compound 30 and the arrow X direction are the same in the Y direction.

The cholesteric liquid crystal layer obtained by immobilizing a cholesteric liquid crystalline phase in the related art typically reflects incident light (circularly polarized light) by specular reflection.

On the other hand, the cholesteric liquid crystal layer 27 including the optical element according to the embodiment of the present invention reflects incidence light in a direction having an angle in the arrow X direction with respect to the incidence light. The cholesteric liquid crystal layer 27 has the liquid crystal alignment pattern in which the optical axis 30A changes while continuously rotating in the arrow X direction in a plane (the predetermined in-plane direction). Hereinafter, the description will be made with reference to FIG. 11.

As described above, the cholesteric liquid crystal layer 27 selectively reflects right circularly polarized light or left circularly polarized light in a selective reflection wavelength. In the following description, it is assumed that the cholesteric liquid crystal layer 27 reflects red right circularly polarized light. In a case where light is incident into the optical element 10, the cholesteric liquid crystal layer 27 reflects only right circularly polarized light $R_R$ of red light and allows transmission of the other light.

In a case where the right circularly polarized light $IR_R$ of red light incident into the cholesteric liquid crystal layer 27 is reflected from the cholesteric liquid crystal layer 27, the absolute phase changes depending on the directions of the optical axes 30A of the respective liquid crystal compounds 30.

Here, in the cholesteric liquid crystal layer 27, the optical axis 30A of the liquid crystal compound 30 changes while rotating in the arrow X direction (the in-plane direction). Therefore, the amount of change in the absolute phase of the incident right circularly polarized light $R_R$ of red light varies depending on the directions of the optical axes 30A.

Further, the liquid crystal alignment pattern formed in the cholesteric liquid crystal layer 27 is a pattern that is periodic in the arrow X direction. Therefore, as conceptually shown in FIG. 11, an absolute phase Q that is periodic in the arrow X direction corresponding to the direction of the optical axis 30A is assigned to the right circularly polarized light $R_R$ of red light incident into the cholesteric liquid crystal layer 27.

In addition, the direction of the optical axis 30A of the liquid crystal compound 30 with respect to the arrow X direction is uniform in the arrangement of the liquid crystal compound 30 in the Y direction perpendicular to arrow X direction.

As a result, in the cholesteric liquid crystal layer 27, an equiphase surface E that is tilted in the arrow X direction with respect to an XY plane is formed for the right circularly polarized light $R_R$ of red light.

Therefore, the right circularly polarized light $R_R$ of red light is reflected in the normal direction of the equiphase surface E, and the reflected right circularly polarized light $R_R$ of red light is reflected in a direction that is tilted in the arrow X direction with respect to the XY plane (main surface of the cholesteric liquid crystal layer 27).

In the optical element 10 according to the embodiment of the present invention, the single period Λ in the alignment pattern of the cholesteric liquid crystal layer is not particularly limited and may be appropriately set depending on the use of the optical element 10 and the like.

Even in the optical element including the optically-anisotropic layer (cholesteric liquid crystal layer) 27 having cholesteric alignment, a plurality of cholesteric liquid crystal layers 27 may be provided. In a case where the optical element includes a plurality of optically-anisotropic layers, the single periods Λ of the liquid crystal alignment patterns of the optically-anisotropic layers may be the same as or different from each other. In addition, the liquid crystal alignment patterns may vary depending on the optically-anisotropic layers.

In addition, in a case where the optical element includes a plurality of cholesteric liquid crystal layers, the cholesteric liquid crystal layers may have different selective reflection wavelengths. For example, in a case where the optical element includes a cholesteric liquid crystal layer that reflects red light, the cholesteric liquid crystal layer that reflects green light, and a cholesteric liquid crystal layer that reflects blue light, by adjusting diffraction angles of the respective cholesteric liquid crystal layers to be the same, the optical element can diffract red light, green light, and blue light in the same direction and can correspond to a full color image.

Alternatively, in a case where the optical element includes a plurality of cholesteric liquid crystal layers, the cholesteric liquid crystal layers may have different selective reflection wavelengths and may have different diffraction angles of light of the respective cholesteric liquid crystal layers. As a result, for example, red light, green light, and blue light can be diffracted in different directions to be separated.

In addition, the optical element including the cholesteric liquid crystal layer is not limited to the configuration in which the optical axis 30A of the liquid crystal compound 30 in the liquid crystal alignment pattern of the cholesteric liquid crystal layer continuously rotates only in the arrow X direction, and various configurations can be used as long as the optical axis 30A of the liquid crystal compound 30 in the cholesteric liquid crystal layer continuously rotates in the in-plane direction.

For example, as in the optically-anisotropic layer 26 conceptually shown in FIG. 8, a cholesteric liquid crystal layer may be used in which a liquid crystal alignment pattern is a concentric circular pattern having a concentric circular shape where the in-plane direction in which the direction of the optical axis of the liquid crystal compound 30 changes while continuously rotating moves from an inside toward an outside.

Alternatively, a liquid crystal alignment pattern can also be used where the in-plane direction in which the direction of the optical axis of the liquid crystal compound 30 changes while continuously rotating is provided in a radial shape from the center of the cholesteric liquid crystal layer instead of a concentric circular shape.

Another examples of the manufacturing method according to the embodiment of the present invention is a method of manufacturing an optical element, the optical element including an optically-anisotropic layer that is formed using a liquid crystal composition including a liquid crystal compound, an alignment film that aligns the liquid crystal compound, and a support, the method comprising:

an alignment film forming step of forming the alignment film on one surface of the support; and an optically-anisotropic layer forming step of forming the optically-anisotropic layer on the alignment film, in which the alignment film includes a photo-alignable material, the alignment film forming step includes a step of causing light to be incident into the polarization diffractive optical element and an exposure step of exposing the alignment film to polarized light that is converted by the polarization diffractive optical element, and the support has a light absorption band that overlaps a light absorption band where a photochemical reaction occurs in the alignment film by irradiating the alignment film with the polarized light in the exposure step.

Here, according to an investigation by the present inventors, it was found that, in a case where the alignment film is irradiated with the polarized light that is converted by the polarization diffractive optical element to form the alignment pattern on the alignment film and the liquid crystal layer is formed on the alignment film, there is a problem in that unevenness occurs in a plane of the liquid crystal layer. It is presumed that, due to this reason, a part of the irradiated light is reflected from an interface of the support 20 and irradiated to the alignment film again as in the case where the alignment film is exposed to the above-described coherent light.

In a case where the alignment pattern is formed on the alignment film using the polarization diffractive optical element, collimated light is incident into the polarization diffractive optical element, and the alignment film is irradiated with diffracted light that is converted by the polarization diffractive optical element. The alignment film is irradiated with the diffracted light that interferes such that the alignment pattern is formed on the alignment film. In a case where the alignment film is exposed the coherent light of the above-described two or more polarized beams, as shown in FIG. 5, a part of the beams (MA, MB) irradiated from the alignment film 24 side transmits through the alignment film 24 and is incident into the support 20 such that a part of the light incident into the support 20 is reflected from a surface (hereinafter, referred to as "rear surface") of the support 20 opposite to the surface where the alignment film 24 is formed. The light ($L_{r1}$, $L_{r2}$) reflected from the rear surface of the support 20 is irradiated again to the alignment film 24. At this time, the beams (MA, MB) with which the alignment film 24 is irradiated is irradiated to a main surface of the alignment film 24 from an oblique direction. Therefore, the light ($L_{r1}$, $L_{r2}$) reflected from the rear surface of the support 20 is irradiated to a region of the alignment film 24 different from the region irradiated with the beam (MA, MB). The alignment film 24 is also exposed to the reflected light ($L_{r1}$, $L_{r2}$). Therefore, the region different from the region irradiated with the beams (MA, MB) is also exposed. Thus, the alignment pattern formed by the beams (MA, MB) overlaps the exposure pattern formed by the reflected light ($L_{r1}$, $L_{r2}$) such that unevenness occurs. As a result, in the optically-anisotropic layer 26 formed on the alignment film 24 where unevenness occurs, unevenness also occurs in the alignment pattern of the liquid crystal compound. In a case where unevenness occurs in the optically-anisotropic layer 26, desired optical properties cannot be obtained.

On the other hand, in the manufacturing method according to the embodiment of the present invention, the support 20 has the light absorption band that overlaps the light absorption band where the photochemical reaction of the alignment film 24 occurs. That is, the support 20 has a function of absorbing at least a part of the light (beams MA, MB) irradiated to the alignment film 24 in the exposure step.

Since the support 20 has the function of absorbing at least a part of the beams (MA, MB), the beams (MA, MB) that transmit through the alignment film 24 and are incident into the support 20 are absorbed by the support 20, and the amount of the light ($L_{r1}$, $L_{r2}$) reflected from the rear surface of the support 20 is reduced. Accordingly, the exposure of the alignment film 24 to the reflected light ($L_{r1}$, $L_{r2}$) can be suppressed, and the occurrence of unevenness in the alignment pattern formed on the alignment film 24 can be suppressed. As a result, the occurrence of unevenness in the alignment pattern of the optically-anisotropic layer 26 formed on the alignment film 24 can be suppressed, and desired optical properties can be obtained.

It is preferable that the polarization diffractive optical element has a phase difference of $\lambda e/2$ with respect to a wavelength $\lambda e$ of the light to which the polarization diffractive optical element exposes the alignment film. As a result, the period pattern depending on the interference state of the diffracted light that is converted by the polarization diffractive optical element can be formed and controlled with high accuracy.

In addition, it is preferable that the light incident into the polarization diffractive optical element is linearly polarized light.

The polarization diffractive optical element is a diffraction element that controls a diffraction direction or a polarization state of emitted light and a diffracted light intensity depending on the polarization state of incident light by controlling the polarization state in a fine region. Examples of the polarization diffraction element include a polarization diffraction element in which a diffraction structure is formed using structural birefringence described in Erez Hasman et al., Polarization dependent focusing lens by use of quantized Pancharatnm-Berry phase diffractive optics, Applied Physics Letters, Volume 82, Number 3, pp. 328-330 and a polarization diffraction element in which a diffraction structure is formed using a birefringence material described in JP5462783B.

Examples of the polarization diffraction element include a liquid crystal diffraction element that is formed using a composition including a liquid crystal compound and has a liquid crystal alignment pattern in which a direction of an optical axis derived from the liquid crystal compound changes while continuously rotating in at least one in-plane direction.

Another examples of the manufacturing method according to the embodiment of the present invention is a method of manufacturing an optical element, the optical element including an optically-anisotropic layer that is formed using a liquid crystal composition including a liquid crystal compound, an alignment film that aligns the liquid crystal compound, and a support, the method comprising:

an alignment film forming step of forming the alignment film on one surface of the support; and an optically-anisotropic layer forming step of forming the optically-anisotropic layer on the alignment film, in which the alignment film includes a photo-alignable material, the alignment film forming step includes an exposure step of exposing different in-plane positions of the alignment film by freely changing a polarization direction of a focused polarized beam, and the support has a light absorption band that overlaps a light absorption band where a photochemical reaction occurs in the alignment film by irradiating the alignment film with the polarized light in the exposure step.

Here, according to an investigation by the present inventors, it was found that, in a case where different in-plane positions of the alignment film are irradiated with focused polarized beams to form the alignment pattern on the alignment film by freely changing the polarization direction of the polarized beam and the liquid crystal layer is formed on the alignment film, there is a problem in that unevenness occurs in a plane of the liquid crystal layer. It is presumed that, due to this reason, a part of the irradiated light is reflected from an interface of the support 20 and irradiated to the alignment film again as in the case where the alignment film is exposed to the above-described coherent light.

In a case where the alignment pattern is formed on the alignment film by freely changing the polarization direction of the focused polarized beam, the alignment film is irradiated with the focused polarized beam, and a part of the light transmits through the alignment film and is incident into the support while being scattered. Accordingly, in a case where the alignment film is exposed the coherent light of the above-described two or more polarized beams, as shown in FIG. 5, a part of the beams (MA, MB) irradiated from the alignment film 24 side transmits through the alignment film 24 and is incident into the support 20 such that a part of the light incident into the support 20 is reflected from a surface (hereinafter, referred to as "rear surface") of the support 20 opposite to the surface where the alignment film 24 is formed. The light ($L_{r1}$, $L_{r2}$) reflected from the rear surface of the support 20 is irradiated again to the alignment film 24. At this time, the beams (MA, MB) with which the alignment film 24 is irradiated is irradiated to a main surface of the alignment film 24 from an oblique direction. Therefore, the light ($L_{r1}$, $L_{r2}$) reflected from the rear surface of the support 20 is irradiated to a region of the alignment film 24 different from the region irradiated with the beam (MA, MB). The alignment film 24 is also exposed to the reflected light ($L_{r1}$, $L_{r2}$). Therefore, the region different from the region irradiated with the beams (MA, MB) is also exposed. Thus, the alignment pattern formed by the beams (MA, MB) overlaps the exposure pattern formed by the reflected light ($L_{r1}$, $L_{r2}$) such that unevenness occurs. As a result, in the optically-anisotropic layer 26 formed on the alignment film 24 where unevenness occurs, unevenness also occurs in the alignment pattern of the liquid crystal compound. In a case where unevenness occurs in the optically-anisotropic layer 26, desired optical properties cannot be obtained.

On the other hand, in the manufacturing method according to the embodiment of the present invention, the support 20 has the light absorption band that overlaps the light absorption band where the photochemical reaction of the alignment film 24 occurs. That is, the support 20 has a function of absorbing at least a part of the light (beams MA, MB) irradiated to the alignment film 24 in the exposure step.

Since the support 20 has the function of absorbing at least a part of the beams (MA, MB), the beams (MA, MB) that transmit through the alignment film 24 and are incident into the support 20 are absorbed by the support 20, and the amount of the light ($L_{r1}$, $L_{r2}$) reflected from the rear surface of the support 20 is reduced. Accordingly, the exposure of the alignment film 24 to the reflected light ($L_{r1}$, $L_{r2}$) can be suppressed, and the occurrence of unevenness in the alignment pattern formed on the alignment film 24 can be suppressed. As a result, the occurrence of unevenness in the alignment pattern of the optically-anisotropic layer 26 formed on the alignment film 24 can be suppressed, and desired optical properties can be obtained.

It is preferable that the focused polarized beam used in the exposure step is linearly polarized light.

Examples of a method of changing the polarization direction of the focused polarized beam include a method of rotating a phase difference plate (wave plate) and a method of using a phase modulation element such as a liquid crystal cell.

The optical element according to the embodiment of the present invention can be used for various uses where transmission of light in a direction different from an incidence direction is allowed, for example, an optical path changing member, a light collecting element, a light diffusing element to a predetermined direction, a diffraction element, or the like in an optical device.

Figure 12:
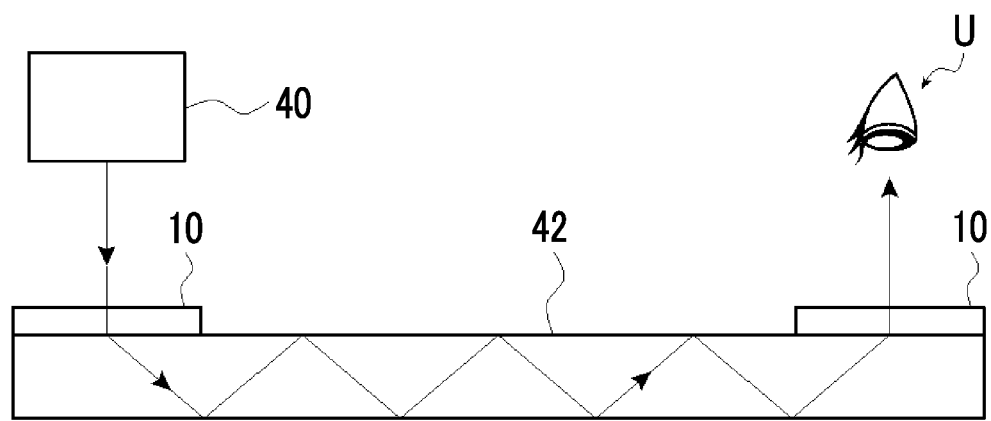
FIG. 12 is a diagram conceptually showing an example of AR glasses including one example of the optical element according to the present invention.

In a preferable example, as conceptually shown in FIG. 12, the optical element 10 can be used as a diffraction element that is provided to be spaced from one surface of a light guide plate 42 such that, in the above-described AR glasses, light (projection image) emitted from a display 40 is introduced into the light guide plate 42 in the above-described AR glasses at a sufficient angle for total reflection and the light propagated in the light guide plate 42 is emitted from the light guide plate 42 to an observation position by a user U in the AR glasses.

As described above, the optical element 10 according to the embodiment of the present invention refracts light during transmission. Therefore, light with which the display 40 is irradiated can be refracted to be incident into the light guide plate 42 from an oblique direction. Thus, light can be caused to propagate to the emission side by one light guide plate 42. In addition, the light emitted from the light guide plate 42 can be refracted by the optical element 10 disposed on the light emission side of the light guide plate 42 to be guided to an observation position of the user U. Accordingly, in AR glasses including the optical element 10 according to the embodiment of the present invention, the light guide plate can be made thin and light as a whole, and the configuration of the AR glasses can be simplified.

The light guide element according to the embodiment of the present invention is not limited to the configuration in which two optical elements 10 according to the embodiment of the present invention spaced from each other are provided in the light guide plate 42 as shown in FIG. 12. A configuration may be adopted in which only one optical element 10 according to the embodiment of the present invention is provided in the light guide plate for introduction or extraction of light into or from the light guide plate 42.

Figure 13:
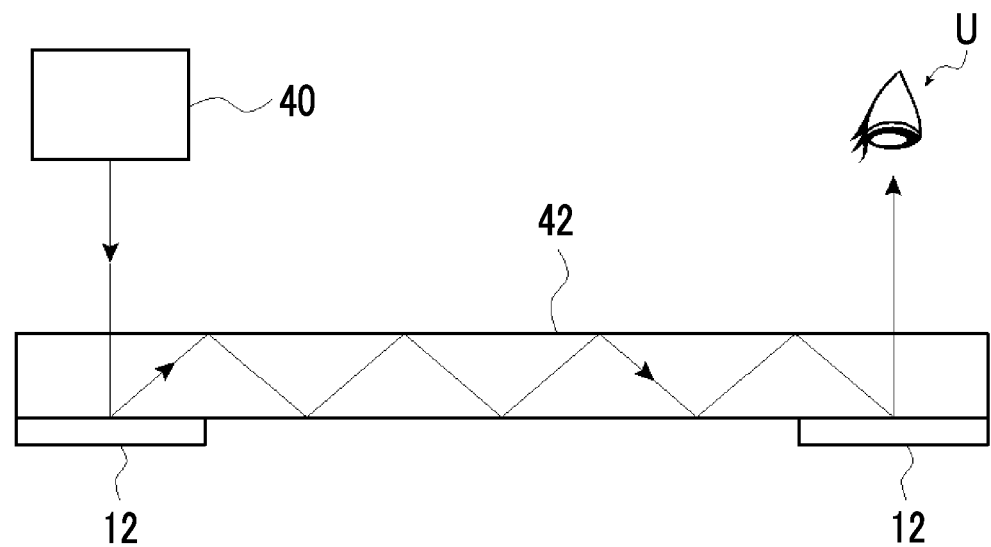
FIG. 13 is a diagram conceptually showing an example of AR glasses including another example of the optical element according to the present invention.

In addition, in AR glasses, in a case where the optical element 12 including the cholesteric liquid crystal layer 27 is used, as conceptually shown in FIG. 13, the optical element 12 is disposed on a surface of the light guide plate 42 facing the display 40, and the optical element 12 is disposed on a surface facing the observation position of the user U.

As described above, the optical element 12 including the cholesteric liquid crystal layer refracts light during reflection. Therefore, light that is irradiated to the display 40 and is vertically incident into the light guide plate 42 is refracted in an oblique direction. Thus, light can be caused to propagate to the emission side by one light guide plate 42. In addition, light can be reflected and refracted in a direction perpendicular to the emission surface of the light guide plate 42 by the optical element 12 disposed on the light emission side of the light guide plate 42 to be guided to the observation position of the user U. Accordingly, in AR glasses including the optical element according to the embodiment of the present invention, the light guide plate can be made thin and light as a whole, and the configuration of the AR glasses can be simplified.

Hereinabove, the method of manufacturing an optical element and the optical element according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

<Preparation of Optically-Anisotropic Member>
[Preparation of Support]
(Preparation of Core Layer Cellulose Acylate Dope)

The following composition was put into a mixing tank and was stirred to dissolve the respective components. As a result, a cellulose acetate solution was prepared as a core layer cellulose acylate dope.

| Core layer cellulose acylate dope | |
| --- | --- |
| Cellulose acetate having an acetyl substitution degree of 2.88 | 100 parts by mass |
| Polyester A | 12 parts by mass |
| Methylene chloride (first solvent) | 430 parts by mass |
| Methanol (second solvent) | 64 parts by mass |

As the polyester A, a polyester A shown in [Table 1] of JP2015-227956A was used.

(Preparation of Outer Layer Cellulose Acylate Dope)

10 parts by mass of the following matting agent solution was added to 90 parts by mass of the above-described core layer cellulose acylate dope to prepare a cellulose acetate solution as an outer layer cellulose acylate dope.

| Matting agent solution | |
| --- | --- |
| Silica particles having an average particle size of 20 nm (AEROSIL R971, manufactured by Nippon Aerosil Co., Ltd.) | 2 parts by mass |
| Methylene chloride (first solvent) | 76 parts by mass |
| Methanol (second solvent) | 11 parts by mass |
| Core layer cellulose acylate dope | 1 part by mass |

The above-described core layer cellulose acylate dope and the above-described outer layer cellulose acylate dope were filtered through filter paper having an average pore size of 34 μm and a sintered metallic filter having an average pore size of 10 μm, respectively. Next, three layers of the core layer cellulose acylate dope and the outer layer cellulose acylate dope disposed on opposite sides of the core layer cellulose acylate dope were simultaneously cast on a drum at 20° C. from casting nozzles using a band casting machine.

Next, the obtained film was removed in a state where the solvent content was about 20 mass %, opposite ends of the film in the width direction were fixed using a tenter clip, and the film was horizontally stretched to a stretching ratio of 1.1% and dried.

Next, by transporting the film between rolls of a heat treatment device and further drying the film, a cellulose support having a thickness of 20 μm was prepared. In the prepared cellulose support, the thickness of the core layer was 15 μm, and the thickness of each of the outer layers disposed on opposite sides of the core layer was 2.5 μm.

(Saponification Treatment of Support)

The support prepared as described above was caused to pass through a dielectric heating roll at a temperature of 60° C. such that the support surface temperature was increased to 40° C.

Next, an alkali solution shown below was applied to a single surface of the support using a bar coater in an application amount of 14 mL (liter)/m², the support was heated to 110° C., and the support was transported for 10 seconds under a steam far infrared electric heater (manufactured by Noritake Co., Ltd.).

Next, 3 mL/m² of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

| Alkali Solution | |
|---|---|
| Potassium hydroxide | 4.70 parts by mass |
| Water | 15.80 parts by mass |
| Isopropanol | 63.70 parts by mass |
| Surfactant SF-1: $C_{14}H_{29}O(CH_2CH_2O)_2OH$ | 1.0 part by mass |
| Propylene glycol | 14.8 parts by mass |

(Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

| Undercoat Layer-Forming Coating Solution | |
|---|---|
| The following modified polyvinyl alcohol | 2.40 parts by mass |
| Isopropyl alcohol | 1.60 parts by mass |
| Methanol | 36.00 parts by mass |
| Water | 60.00 parts by mass |

Modifieid Polyvinyl Alcohol (Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

Alignment Film-Forming Coating Solution

| Material A for photo-alignment | 1.00 part by mass |
|---|---|
| Water | 16.00 parts by mass |
| Butoxyethanol | 42.00 parts by mass |
| Propylene glycol monomethyl ether | 42.00 parts by mass |

Material A for Photo-Alignment (Exposure of Alignment Film)

The alignment film was exposed using the exposure device shown in FIG. 4 to form an alignment film P-1 having an alignment pattern.

In the exposure device, a laser that emits laser light having a wavelength (325 nm) was used as the laser. The exposure dose of the coherent light was 100 mJ/cm². The single period (the length over which the optical axis derived from the liquid crystal compound rotates by 180°) of an alignment pattern formed by interference of two laser beams was controlled by changing an intersecting angle (intersecting angle α) between the two beams.

(Formation of Optically-Anisotropic Layer)

As the liquid crystal composition forming the optically-anisotropic layer, the following composition A-1 was prepared.

| Composition A-1 | |
|---|---|
| Liquid crystal compound L-1 | 100.00 parts by mass |
| Polymerization initiator (IRGACURE (registered trade name) 907, manufactured by BASFSE) | 3.00 parts by mass |
| Photosensitizer (KAYACURE DETX-S, manufactured by Nippon Kayaku Co., Ltd.) | 1.00 part by mass |
| Leveling agent T-1 | 0.24 parts by mass |
| Methyl ethyl ketone | 1087.80 parts by mass |

Liquid Crystal Compound L-1

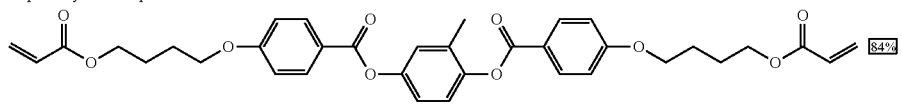

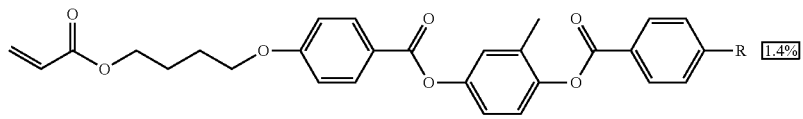

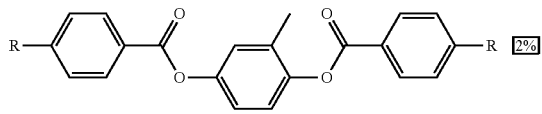

R:
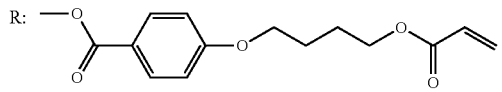

Leveling Agent T-1

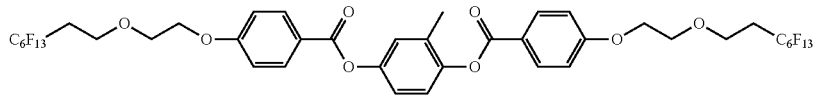

The optically-anisotropic layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the following composition A-1 was applied to the alignment film P-1 to form a coating film, the coating film was heated using a hot plate at 70° C., the coating film was cooled to 25° C., and the coating film was irradiated with ultraviolet light having a wavelength of 365 nm at an irradiation dose of 100 mJ/cm² using a high-pressure mercury lamp in a nitrogen atmosphere. As a result, the alignment of the liquid crystal compound was immobilized. In this case, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, an optically-anisotropic layer was formed, and an optically-anisotropic member was prepared.

The $\Delta n_\lambda$ of liquid crystal×the thickness (Re($\lambda$)) was obtained by applying the composition A-1 to a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer (cured layer), and measuring the retardation value of the liquid crystal immobilized layer. The retardation value at a desired wavelength was appropriately measured using Axoscan (manufactured by Axometrics, Inc.).

Finally, in the optically-anisotropic layer, $\Delta n_{530} \times$ thickness (Re(530)) of the liquid crystals was 265 nm, and it was verified using a polarizing microscope that periodic alignment occurred on the surface as shown in FIG. 2. In the liquid crystal alignment pattern of the first optically-anisotropic layer, the single period over which the optical axis derived from the liquid crystal compound rotated by 180° was 10 μm. Hereinafter, unless specified otherwise, "$\Delta n_{530} \times d$" and the like were measured as described above.

Example 1

<Preparation of Optically-Anisotropic Member>
[Preparation of Support]
A support was prepared using the same method as that of Comparative Example 1, except that the following core layer cellulose acylate dope was used.

| Core layer cellulose acylate dope | |
| --- | --- |
| Cellulose acetate having an acetyl substitution degree of 2.88 | 100 parts by mass |
| Polyester A | 12 parts by mass |
| Ultraviolet absorber V | 2.3 parts by mass |
| Methylene chloride (first solvent) | 430 parts by mass |
| Methanol (second solvent) | 64 parts by mass |

Ultraviolet Absorber V

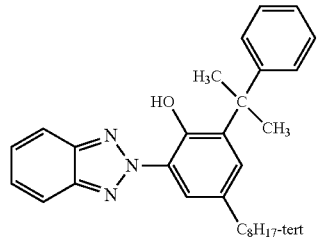

An optically-anisotropic member was prepared using the same method as that of Comparative Example 1, except that the above-described support was used.

Comparative Example 2

An optically-anisotropic member was prepared using the same method as that of Comparative Example 1, except that an intersecting angle (intersecting angle α) between two laser beams was changed.

Comparative Example 3

An optically-anisotropic member was prepared using the same method as that of Comparative Example 1, except that an intersecting angle (intersecting angle α) between two laser beams was changed.

Example 2

An optically-anisotropic member was prepared using the same method as that of Example 1, except that an intersecting angle (intersecting angle α) between two laser beams was changed.

Example 3

An optically-anisotropic member was prepared using the same method as that of Example 1, except that an intersecting angle (intersecting angle α) between two laser beams was changed.

Comparative Example 4

Using the same method as that of Comparative Example 1, a support was prepared and an alignment film was formed and exposed.

(Formation of Reflection Cholesteric Liquid Crystal Layer)

As the liquid crystal composition forming the cholesteric liquid crystal layer, the following composition B-1 was prepared. This composition B-1 is a liquid crystal composition forming a cholesteric liquid crystal layer (cholesteric liquid crystalline phase) that has a selective reflection center wavelength of 530 nm and reflects right circularly polarized light.

| Composition B-1 | |
| --- | --- |
| Rod-shaped liquid crystal compound L-1 | 100.00 parts by mass |
| Polymerization initiator (IRGACURE (registered trade name) 907, manufactured by BASFSE) | 3.00 parts by mass |
| Photosensitizer (KAYACURE DETX-S, manufactured by Nippon Kayaku Co., Ltd.) | 1.00 part by mass |
| Chiral agent Ch-1 | 5.68 parts by mass |
| Leveling agent T-1 | 0.24 parts by mass |
| Methyl ethyl ketone | 1180.0 parts by mass |

Chiral Agent Ch-1

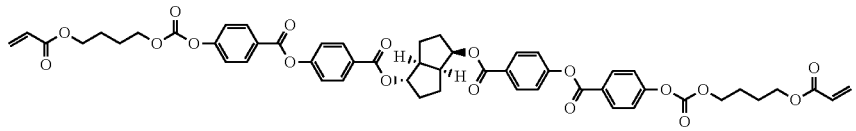 [SMILES: C=CC(=O)OCCCCOC(=O)Oc1ccc(C(=O)Oc2ccc(C(=O)O[C@H]3CC[C@H]4[C@@H]3CC[C@H]4OC(=O)c3ccc(OC(=O)c4ccc(OC(=O)OCCCCOC(=O)C=C)cc4)cc3)cc2)cc1]

The reflection cholesteric liquid crystal layer was formed by applying multiple layers of the composition B-1 to the alignment film P-1. The application of the multiple layers refers to repetition of the following processes including: preparing a first liquid crystal immobilized layer by applying the first layer-forming composition B-1 to the alignment film, heating the composition B-1, cooling the composition B-1, and irradiating the composition B-1 with ultraviolet light for curing; and preparing a second or subsequent liquid crystal immobilized layer by applying the second or subsequent layer-forming composition B-1 to the formed liquid crystal immobilized layer, heating the composition B-1, cooling the composition B-1, and irradiating the composition B-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the following composition B-1 was applied to the alignment film P-1 to form a coating film, the coating film was heated using a hot plate at 95° C., the coating film was cooled to 25° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized. In this case, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, a reflection cholesteric liquid crystal layer was obtained, and a reflecting layer was prepared. In a case where a cross-section of a coating layer was observed with a scanning electron microscope (SEM), the cholesteric liquid crystal layer of the reflecting layer had 8 pitches.

It was verified using a polarizing microscope that the reflection cholesteric liquid crystal layer had a periodically aligned surface as shown in FIG. 2. In the liquid crystal alignment pattern of the reflection cholesteric liquid crystal layer, the single period over which the optical axis derived from the liquid crystal compound rotated by 180° was 10 μm.

Comparative Example 5

An optically-anisotropic member was prepared using the same method as that of Comparative Example 4, except that an intersecting angle (intersecting angle α) between two laser beams was changed.

Comparative Example 6

An optically-anisotropic member was prepared using the same method as that of Comparative Example 4, except that an intersecting angle (intersecting angle α) between two laser beams was changed.

Example 4

An optically-anisotropic member was prepared using the same method as that of Comparative Example 4, except that the support prepared in Example 1 was used.

Example 5

An optically-anisotropic member was prepared using the same method as that of Example 4, except that an intersecting angle (intersecting angle α) between two laser beams was changed.

Example 6

An optically-anisotropic member was prepared using the same method as that of Example 4, except that an intersecting angle (intersecting angle α) between two laser beams was changed.

Example 11

By forming the optically-anisotropic layer and peeling off the support and the alignment film in Example 1, an optically-anisotropic member was prepared.

Example 12

By forming the optically-anisotropic layer and peeling off the support and the alignment film in Example 4, an optically-anisotropic member was prepared.

Comparative Examples 21 to 24

Optically-anisotropic members were prepared using the same method as that of Comparative Example 1, except that an intersecting angle (intersecting angle α) between two laser beams was changed. The thickness of the first liquid crystal layer according to Comparative Example 24 was adjusted to 0.1 μm.

Examples 21 to 24

Optically-anisotropic members were prepared using the same method as that of Example 1, except that an intersecting angle (intersecting angle α) between two laser beams was changed. The thickness of the first liquid crystal layer according to Example 24 was adjusted to 0.1 μm.

Comparative Examples 25 to 28

Optically-anisotropic members were prepared using the same method as that of Comparative Example 4, except that an intersecting angle (intersecting angle α) between two laser beams was changed. The thickness of the first liquid crystal layer according to Comparative Example 28 was adjusted to 0.1 μm.

Examples 25 to 28

Optically-anisotropic members were prepared using the same method as that of Example 4, except that an intersecting angle (intersecting angle α) between two laser beams was changed. The thickness of the first liquid crystal layer according to Example 28 was adjusted to 0.1 μm.

[Evaluation of Surface Shape]

The surface shape (unevenness) of the prepared optically-anisotropic member was evaluated by visual inspection. The results are shown in Tables 1 and 2.

A: unevenness caused by interference exposure was not recognized

B: unevenness caused by interference exposure was slightly recognized, but there was no problem C: unevenness caused by interference exposure was recognized

[Evaluation of Diffraction Angle]

In a case where light was incident into the optically-anisotropic layer of the prepared optically-anisotropic member from the front (direction with an angle of 0° with respect to the normal line), an angle (diffraction angle) of transmitted light (in the case of the reflection cholesteric liquid crystal layer, reflected light) with respect to incidence light was measured.

Specifically, laser light having an output center wavelength at a wavelength of 530 nm was caused to be vertically incident into the prepared optically-anisotropic member, and transmitted light or reflected light was captured using a screen disposed at a distance of 100 cm to calculate a diffraction angle.

In a case where the result in the evaluation of the diffraction angle was total reflection, the diffraction angle was significantly large. Therefore, the optically-anisotropic member was bonded to glass having a refractive index of 1.52, and it was verified that diffracted light was totally reflected in the glass. In addition, in an example where an in-plane pitch described below was 0.3 μm, the diffraction angle was more than that. Therefore, it was verified that diffracted light was totally reflected in a state where light is obliquely incident into the optically-anisotropic member.

TABLE 1

[Transmission Type]

|  | Comparative Example 1 | Comparative Example 2 | Comparative Example 3 | Example 1 | Example 2 | Example 3 | Example 11 |
|---|---|---|---|---|---|---|---|
| Support Absorption | None | None | None | Present | Present | Present | Present |
| In-Plane Pitch [μm] | 10 | 1 | 0.5 | 10 | 1 | 0.5 | 10 |
| Angles between Beams [°] | 1.9 | 19 | 38 | 1.9 | 19 | 38 | 1.9 |
| Evaluations of Surface Shape | C | C | C | A | A | A | A |
| Diffraction Angle [°] | 3 | 32 | Total Reflection | 3 | 32 | Total Reflection | 3 |

TABLE 1-2

[Transmission Type]

|  | Comparative Example 21 | Comparative Example 22 | Comparative Example 23 | Comparative Example 24 | Example 21 | Example 22 | Example 23 | Example 24 |
|---|---|---|---|---|---|---|---|---|
| Support Absorption | None | None | None | None | Present | Present | Present | Present |
| In-Plane Pitch [μm] | 20 | 5 | 0.8 | 0.3 | 20 | 5 | 0.8 | 0.3 |
| Angles between Beams [°] | 1 | 4 | 23 | 66 | 1 | 4 | 23 | 66 |
| Evaluations of Surface Shape | C | C | C | C | A | A | A | A |
| Diffraction Angle [°] | 2 | 6 | 42 | Total Reflection | 2 | 6 | 42 | Total Reflection |

TABLE 2

[Reflection Type: Cholesteric]

|  | Comparative Example 4 | Comparative Example 5 | Comparative Example 6 | Example 4 | Example 5 | Example 6 | Example 12 |
|---|---|---|---|---|---|---|---|
| Support Absorption | None | None | None | Present | Present | Present | Present |
| In-Plane Pitch [μm] | 10 | 1 | 0.5 | 10 | 1 | 0.5 | 10 |
| Angles between Beams [°] | 1.9 | 1.9 | 38 | 1.9 | 19 | 38 | 1.9 |
| Evaluations of Surface Shape | C | C | C | A | A | A | A |
| Diffraction Angle [°] | 3 | 32 | Total Reflection | 3 | 32 | Total Reflection | 3 |

TABLE 2-2

[Reflection Type: Cholesteric]

|  | Comparative Example 25 | Comparative Example 26 | Comparative Example 27 | Comparative Example 28 | Example 25 | Example 26 | Example 27 | Example 28 |
|---|---|---|---|---|---|---|---|---|
| Support Absorption | None | None | None | None | Present | Present | Present | Present |
| In-Plane Pitch [μm] | 20 | 5 | 0.8 | 0.3 | 20 | 5 | 0.8 | 0.3 |

TABLE 2-2-continued

[Reflection Type: Cholesteric]

| | Comparative Example 25 | Comparative Example 26 | Comparative Example 27 | Comparative Example 28 | Example 25 | Example 26 | Example 27 | Example 28 |
|---|---|---|---|---|---|---|---|---|
| Angles between Beams [°] | 1 | 4 | 23 | 66 | 1 | 4 | 23 | 66 |
| Evaluations of Surface Shape | C | C | C | C | A | A | A | A |
| Diffraction Angle [°] | 2 | 6 | 42 | Total Reflection | 2 | 6 | 42 | Total Reflection |

Comparative Example 31

(Preparation of Polarization Diffractive Optical Element)
A polarization diffractive optical element was prepared using the same method as that of the optically-anisotropic member prepared in Example 21. The thickness of the polarization diffractive optical element was adjusted such that the phase difference at a wavelength of 325 nm was 163 nm.

Using the same method as that of Comparative Example 1, a support was prepared, and an alignment film was formed.

(Exposure of Alignment Film)
The polarization diffractive optical element was disposed on the prepared alignment film such that a surface of the polarization diffractive optical element where the liquid crystal layer was formed faced the alignment film side. The alignment film was exposed to laser light (wavelength: 325 nm) through the polarization diffractive optical element to form an alignment film P-2 having an alignment pattern. The exposure dose was 100 mJ/cm$^2$.

(Formation of Optically-Anisotropic Layer)
An optically-anisotropic layer was formed using the same method as that of Comparative Example 1.

The single period over which the optical axis derived from the liquid crystal compound of the prepared optically-anisotropic layer rotated by 180° was 10 μm. The single period over which the optical axis derived from the liquid crystal compound of the prepared polarization diffractive optical element using a mask rotated by 180° was 20 μm.

Example 31

(Preparation of Polarization Diffractive Optical Element)
A polarization diffractive optical element was prepared using the same method as that of Comparative Example 31.

Using the same method as that of Example 1, a support was prepared and an alignment film was formed.

An alignment film was exposed using the same method as that of Comparative Example 31, and an optically-anisotropic layer was formed.

Comparative Examples 32 to 34

Optically-anisotropic members were prepared using the same method as that of the polarization diffractive optical element according to Comparative Example 31, except that an intersecting angle (intersecting angle α) between two laser beams was changed.

Examples 32 to 34

Optically-anisotropic members were prepared using the same method as that of the polarization diffractive optical element according to Example 31, except that an intersecting angle (intersecting angle α) between two laser beams was changed.

Comparative Example 35

A polarization diffractive optical element, a support, and an alignment film were prepared using the same method as that of Comparative Example 31, and the alignment film was exposed.

(Formation of Reflection Cholesteric Liquid Crystal Layer)
A reflection cholesteric liquid crystal layer was formed using the same method as that of Comparative Example 4.

The single period over which the optical axis derived from the liquid crystal compound of the prepared reflection cholesteric liquid crystal layer rotated by 180° was 10 μm. The single period over which the optical axis derived from the liquid crystal compound of the prepared polarization diffractive optical element using a mask rotated by 180° was 20 μm.

Example 35

A polarization diffractive optical element, a support, and an alignment film were prepared using the same method as that of Example 31, and the alignment film was exposed.

(Formation of Reflection Cholesteric Liquid Crystal Layer)
A reflection cholesteric liquid crystal layer was formed using the same method as that of Example 4.

Comparative Examples 36 to 38

Optically-anisotropic members were prepared using the same method as that of the polarization diffractive optical element according to Comparative Example 35, except that an intersecting angle (intersecting angle α) between two laser beams was changed.

Examples 36 to 38

Optically-anisotropic members were prepared using the same method as that of the polarization diffractive optical element according to Example 35, except that an intersecting angle (intersecting angle α) between two laser beams was changed.

TABLE 3

[Transmission Type]

| | Comparative Example 31 | Comparative Example 32 | Comparative Example 33 | Comparative Example 34 | Example 31 | Example 32 | Example 33 | Example 34 |
|---|---|---|---|---|---|---|---|---|
| Support Absorption | None | None | None | None | Present | Present | Present | Present |
| In-Plane Pitch [μm] | 10 | 5 | 3 | 1 | 10 | 5 | 3 | 1 |
| Evaluations of Surface Shape | C | C | C | C | A | A | A | A |
| Diffraction Angle [°] | 3 | 6 | 10 | 32 | 3 | 6 | 10 | 32 |

TABLE 4

[Reflection Type: Cholesteric]

| | Comparative Example 35 | Comparative Example 36 | Comparative Example 37 | Comparative Example 38 | Example 35 | Example 36 | Example 37 | Example 38 |
|---|---|---|---|---|---|---|---|---|
| Support Absorption | None | None | None | None | Present | Present | Present | Present |
| In-Plane Pitch [μm] | 10 | 5 | 3 | 1 | 10 | 5 | 3 | 1 |
| Evaluations of Surface Shape | C | C | C | C | A | A | A | A |
| Diffraction Angle [°] | 3 | 6 | 10 | 32 | 3 | 6 | 10 | 32 |

Comparative Example 41

Using the same method as that of Comparative Example 1, a support was prepared, and an alignment film was formed.

(Exposure of Alignment Film)

By irradiating the alignment film with focused laser light of linearly polarized light to expose the alignment film, an alignment pattern P-3 having an alignment pattern was formed. During the exposure of the alignment film, a laser that emits laser light having a wavelength (325 nm) was used as the laser. By changing the polarization direction of the linearly polarized light depending on the in-plane positions and repeating exposure while changing the exposure position, the entirety of the alignment film was exposed to enter a desired alignment state.

(Formation of Optically-Anisotropic Layer)

An optically-anisotropic layer was formed using the same method as that of Comparative Example 1.

The single period over which the optical axis derived from the liquid crystal compound of the prepared optically-anisotropic layer rotated by 180° was 10 μm.

Example 41

Using the same method as that of Example 1, a support was prepared and an alignment film was formed.

(Exposure of Alignment Film)

Using the same method as that of Comparative Example 41, an alignment film was exposed.

(Formation of Optically-Anisotropic Layer)

An optically-anisotropic layer was formed using the same method as that of Example 1.

Comparative Examples 42 and 43

Optically-anisotropic members were prepared using the same method as that of Comparative Example 41, except that the period of the alignment pattern during the exposure of the alignment film was changed.

Examples 42 and 43

Optically-anisotropic members were prepared using the same method as that of Example 41, except that the period of the alignment pattern during the exposure of the alignment film was changed.

Comparative Example 44

Using the same method as that of Comparative Example 1, a support was prepared, and an alignment film was formed.

(Exposure of Alignment Film)

Using the same method as that of Comparative Example 41, an alignment film was exposed.

(Formation of Reflection Cholesteric Liquid Crystal Layer)

A reflection cholesteric liquid crystal layer was formed using the same method as that of Comparative Example 4.

The single period over which the optical axis derived from the liquid crystal compound of the prepared reflection cholesteric liquid crystal layer rotated by 180° was 10 μm.

Example 44

Using the same method as that of Example 1, a support was prepared and an alignment film was formed.

(Exposure of Alignment Film)

Using the same method as that of Comparative Example 41, an alignment film was exposed.

(Formation of Reflection Cholesteric Liquid Crystal Layer)

A reflection cholesteric liquid crystal layer was formed using the same method as that of Example 4.

Comparative Examples 45 and 46

Optically-anisotropic members were prepared using the same method as that of Comparative Example 44, except that the period of the alignment pattern during the exposure of the alignment film was changed.

Examples 45 and 46

Optically-anisotropic members were prepared using the same method as that of Example 44, except that the period of the alignment pattern during the exposure of the alignment film was changed.

TABLE 5

[Transmission Type]

|  | Comparative Example 41 | Comparative Example 42 | Comparative Example 43 | Example 41 | Example 42 | Example 43 |
|---|---|---|---|---|---|---|
| Support Absorption | None | None | None | Present | Present | Present |
| In-Plane Pitch [μm] | 10 | 4 | 2 | 10 | 4 | 2 |
| Evaluations of Surface Shape | C | C | C | A | A | A |
| Diffraction Angle [°] | 3 | 8 | 15 | 3 | 8 | 15 |

TABLE 6

[Reflection Type: Cholesteric]

|  | Comparative Example 44 | Comparative Example 45 | Comparative Example 46 | Example 44 | Example 45 | Example 46 |
|---|---|---|---|---|---|---|
| Support Absorption | None | None | None | Present | Present | Present |
| In-Plane Pitch [μm] | 10 | 4 | 2 | 10 | 4 | 2 |
| Evaluations of Surface Shape | C | C | C | A | A | A |
| Diffraction Angle [°] | 3 | 8 | 15 | 3 | 8 | 15 |

The alignment film used in each of Comparative Examples 1 to 6, Examples 1 to 6, Examples 11 and 12, Comparative Examples 21 to 28, Examples 21 to 28, Comparative Examples 31 to 38, Examples 31 to 38, Comparative Examples 41 to 46, and Examples 41 to 46 had absorption with respect to light having a wavelength of 325 nm. In addition, the support used in each of Examples 1 to 6, 11, 12, 21 to 28, 31 to 38, and 41 to 46 absorbed 90% or higher of light having a wavelength of 325 nm.

As can be seen from the above results, the effects of the present invention are obvious.

The present invention is suitably applicable to various uses where light is refracted in an optical device, for example, a diffraction element that causes light to be incident into a light guide plate of AR glasses or emits light to the light guide plate.

EXPLANATION OF REFERENCES 10, 12: optical element
20: support
24: alignment film
26, 34: optically-anisotropic layer
27: cholesteric liquid crystal layer (optically-anisotropic layer)
30: liquid crystal compound
30A: optical axis
36: main support
38: light absorbing layer
40: display
42: light guide plate
60, 80: exposure device
62, 82: laser
64, 84: light source
68: beam splitter
70A, 70B, 90A, 90B: mirror
72A, 72B, 96: λ/4 plate
86, 94: polarization beam splitter
92: lens
$R_R$: right circularly polarized light of red light
M: laser light
MA, MB: beam
MP: P polarized light
MS: S polarized light
$P_O$: linearly polarized light
$P_R$: right circularly polarized light
$P_L$: left circularly polarized light
Q1, Q2, Q: absolute phase
E1, E2, E: equiphase surface
U: user

What is claimed is:

1. A method of manufacturing an optical element, the optical element including an optically-anisotropic layer that is formed using a liquid crystal composition including a liquid crystal compound, an alignment film that aligns the liquid crystal compound, and a support, the method comprising:
an alignment film forming step of forming the alignment film on one surface of the support; and
an optically-anisotropic layer forming step of forming the optically-anisotropic layer on the alignment film, wherein the alignment film includes a photo-alignable material, the alignment film forming step includes an exposure step of exposing different in-plane positions of the alignment film to light components having different polarization directions, the support has a light absorption band that overlaps a light absorption band where a photochemical reaction occurs in the alignment film by irradiating the alignment film with the polarized light in the exposure step, the support includes a main support and a light absorbing layer that absorbs light in the light absorption band overlapping the light absorption band where the photochemical reaction of the alignment film occurs, in the alignment film forming step, the alignment film is directly formed on the main support, and a peeling step of peeling the main support and the light absorbing layer together after the optically-anisotropic layer forming step.

2. The method of manufacturing an optical element according to claim 1,
wherein in the exposure step, the alignment film is exposed to two or more polarized beams that are caused to interfere with each other.

3. The method of manufacturing an optical element according to claim 2,
wherein the two or more polarized beams are laser light.

4. The method of manufacturing an optical element according to claim 2,
wherein at least two beams among the two or more polarized beams have the same wavelength.

5. The method of manufacturing an optical element according to claim 2,
wherein at least two beams among the two or more polarized beams have the same light intensity.

6. The method of manufacturing an optical element according to claim 2,
wherein at least two beams among the two or more polarized beams are different polarized light components.

7. The method of manufacturing an optical element according to claim 2,
wherein the two or more polarized beams include polarized light components perpendicular to each other.

8. The method of manufacturing an optical element according to claim 2,
wherein the two or more polarized beams include left circularly polarized light and right circularly polarized light.

9. The method of manufacturing an optical element according to claim 2,
wherein in the exposure step, a polarization state of coherent light obtained by causing the two or more polarized beams to interfere with each other has a period pattern.

10. The method of manufacturing an optical element according to claim 9,
wherein the alignment film exhibits anisotropy through a photochemical reaction based on the period pattern of the polarization state of the coherent light obtained by causing the two or more polarized beams to interfere with each other.

11. The method of manufacturing an optical element according to claim 10,
wherein the optically-anisotropic layer has a liquid crystal alignment pattern based on the anisotropic period pattern of the alignment film.

12. The method of manufacturing an optical element according to claim 1,
wherein in the exposure step, light is caused to be incident into a polarization diffractive optical element such that the light is converted into polarized light, and the alignment film is exposed to the polarized light.

13. The method of manufacturing an optical element according to claim 12,
wherein the polarization diffractive optical element has a phase difference of $\lambda e/2$ with respect to a wavelength $\lambda e$ of the light to which the polarization diffractive optical element exposes the alignment film.

14. The method of manufacturing an optical element according to claim 12,
wherein the light incident into the polarization diffractive optical element is linearly polarized light.

15. The method of manufacturing an optical element according to claim 1,
wherein in the exposure step, the different in-plane positions of the alignment film are exposed by freely changing a polarization direction of a focused polarized beam.

16. The method of manufacturing an optical element according to claim 15,
wherein the focused polarized beam is linearly polarized light.

17. The method of manufacturing an optical element according to claim 1,
wherein the light to which the alignment film is exposed is laser light.

18. The method of manufacturing an optical element according to claim 1,
wherein the alignment film exposed in the exposure step aligns the liquid crystal compound such that the liquid crystal compound has an alignment pattern in which a direction of an optical axis derived from the liquid crystal compound corresponds to a polarization direction of the light to which the alignment film is exposed.

19. The method of manufacturing an optical element according to claim 1,
wherein the alignment film exposed in the exposure step aligns the liquid crystal compound such that the liquid crystal compound has an alignment pattern in which a direction of an optical axis derived from the liquid crystal compound continuously changes while rotating in at least one in-plane direction.

20. The method of manufacturing an optical element according to claim 1,
wherein a wavelength of at least a part of a light absorption band of the alignment film is 200 nm to 500 nm.

* * * * *